(12) United States Patent
Kim et al.

(10) Patent No.: US 10,172,170 B2
(45) Date of Patent: Jan. 1, 2019

(54) METHOD FOR CHANGING ASSOCIATION ID IN WIRELESS COMMUNICATION SYSTEM AND APPARATUS THEREFOR

(71) Applicant: LG ELECTRONICS INC., Seoul (KR)

(72) Inventors: Jeongki Kim, Anyang-si (KR); Yongho Seok, Anyang-si (KR); Seunghee Han, Anyang-si (KR); Jinsoo Choi, Anyang-si (KR); Jinsam Kwak, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 14/378,742

(22) PCT Filed: Mar. 26, 2013

(86) PCT No.: PCT/KR2013/002504
§ 371 (c)(1),
(2) Date: Aug. 14, 2014

(87) PCT Pub. No.: WO2013/147496
PCT Pub. Date: Oct. 3, 2013

(65) Prior Publication Data
US 2016/0088665 A1     Mar. 24, 2016

Related U.S. Application Data

(60) Provisional application No. 61/732,940, filed on Dec. 4, 2012, provisional application No. 61/615,355, filed on Mar. 26, 2012.

(51) Int. Cl.
*H04W 76/11* (2018.01)
*H04W 76/14* (2018.01)
(Continued)

(52) U.S. Cl.
CPC .......... *H04W 76/11* (2018.02); *H04W 74/008* (2013.01); *H04W 76/14* (2018.02);
(Continued)

(58) Field of Classification Search
CPC . H04W 24/02; H04W 76/021; H04W 76/023; H04W 74/008; H04W 76/043; H04W 84/12; H04W 88/08
See application file for complete search history.

(56) References Cited

U.S. PATENT DOCUMENTS

2006/0058029 A1     3/2006   Lee et al.
2007/0297438 A1*   12/2007   Meylan ............ H04W 52/0225
                                                 370/445

(Continued)

FOREIGN PATENT DOCUMENTS

| KR | 1020100002283 A | 1/2010 |
|----|-----------------|--------|
| KR | 1020110003370 A | 1/2011 |
| WO | 0115387 A1      | 3/2001 |

*Primary Examiner* — Hassan Kizou
*Assistant Examiner* — Abdullahi Ahmed
(74) *Attorney, Agent, or Firm* — Dentons US LLP

(57) ABSTRACT

The present invention discloses a method for changing an association ID in a wireless communication system and an apparatus therefor. Specifically, a method for changing an association identification (AID) of a first station (STA) communicating directly with a second STA in a wireless communication system comprises the steps of: receiving, from an access point (AP), a reassignment response frame containing new AID information to be newly allocated to the first STA; the first STA transmitting an update request frame containing the new AID information to the second STA; and as a response to the update request frame, receiving an update response frame from the second STA.

8 Claims, 38 Drawing Sheets

(51) Int. Cl.
*H04W 74/00* (2009.01)
*H04W 76/23* (2018.01)
*H04W 84/12* (2009.01)
*H04W 88/08* (2009.01)

(52) U.S. Cl.
CPC ............ *H04W 76/23* (2018.02); *H04W 84/12* (2013.01); *H04W 88/08* (2013.01)

(56) References Cited

U.S. PATENT DOCUMENTS

| | | | |
|---|---|---|---|
| 2009/0046683 A1* | 2/2009 | Jung | H04W 56/002 370/338 |
| 2009/0231995 A1* | 9/2009 | Chu | H04W 74/0841 370/225 |
| 2010/0220601 A1* | 9/2010 | Vermani | H04W 28/04 370/248 |
| 2011/0317630 A1* | 12/2011 | Zhu | H04W 74/0816 370/329 |
| 2012/0051312 A1 | 3/2012 | Noh et al. | |
| 2012/0063335 A1* | 3/2012 | Cho | H04W 8/186 370/252 |
| 2013/0142184 A1* | 6/2013 | Wang | H04L 5/0053 370/338 |
| 2015/0156660 A1* | 6/2015 | Luo | H04W 8/02 370/230 |
| 2016/0165534 A1* | 6/2016 | Kim | H04W 52/0229 370/311 |

\* cited by examiner

FIG. 7

| Category | Action Details |
|----------|----------------|

Octets:        1                variable

FIG. 19
(a) 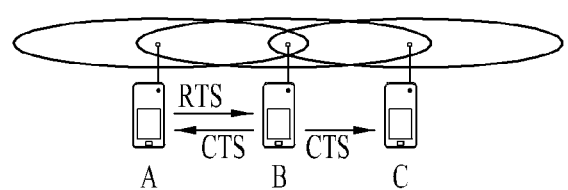
(b) 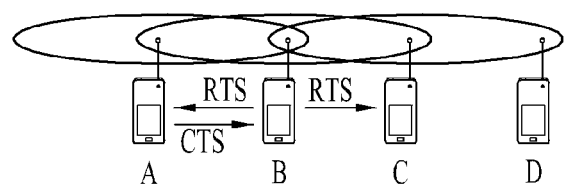

FIG. 26

| AID | Current Num of AID |
|-----|--------------------|

METHOD FOR CHANGING ASSOCIATION ID IN WIRELESS COMMUNICATION SYSTEM AND APPARATUS THEREFOR

This application is a 35 USC § 371 National Stage entry of International Application No. PCT/KR2013/002504, filed on Mar. 26, 2013, and claims priority to U.S. Provisional Application Nos. 61/615,355, filed Mar. 26, 2012; and 61/732,940 filed Dec. 4, 2012, all of which are hereby incorporated by reference in their entireties as if fully set forth herein.

TECHNICAL FIELD

The present invention relates to a wireless communication system, and more particularly, to a method of changing an association identification in a wireless LAN system and apparatus for supporting the same.

BACKGROUND ART

Recently, various kinds of wireless communication technologies have been developed together with the developments of the information communication technology. Particularly, wireless LAN (WLAN) is the technology for accessing Internet by wireless in a home, a company or a specific service provided area using such a mobile user equipment as a personal digital assistant (PDA), a laptop computer, a portable multimedia player (PMP) and the like based on a radio frequency technology.

In order to overcome the limitation put on a communication speed pointed out as a weak point of WLAN, the recent technology standard has introduced a system having an enhanced speed and reliability of a network and an extended operating distance of a wireless network. For instance, IEEE 802.11n has introduced the application of MIMO (Multiple Inputs and Multiple Outputs) that uses multiple antennas at both ends including a transmitting unit and a receiving unit in order to support high throughput for a data processing speed over maximum 540 Mbps, minimize transmission error, and optimize a data rate or speed.

DISCLOSURE OF THE INVENTION

Technical Tasks

One technical task of the present invention is to provide an enhanced method of changing AID in a wireless communication system, and preferably, in a WLAN system and apparatus therefor.

Another technical task of the present invention is to provide a method for, when an AID of a specific station is changed, a counterpart station directly communicating with the specific station to recognize the changed AID of the specific station and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of changing AID (association identification) of a $1^{st}$ station performing a direct communication with a $2^{nd}$ station (STA) in a wireless communication system according to one embodiment of the present invention includes the steps of receiving a reassignment response frame containing a new AID information to be newly assigned to the $1^{st}$ station from an AP (access point), transmitting an update request frame containing the new AID information from the $1^{st}$ station to the $2^{nd}$ station, and receiving an update response frame from the $2^{nd}$ station in response to the update request frame.

To further achieve these and other advantages and in accordance with the purpose of the present invention, as embodied and broadly described, a method of changing AID (association identification) of a $1^{st}$ station performing a direct communication with a $2^{nd}$ station (STA) in a wireless communication system according to another embodiment of the present invention includes the steps of receiving a reassignment request frame containing a $2^{nd}$ old AID information of the $2^{nd}$ station from the $1^{st}$ station, transmitting a $1^{st}$ frame containing a $1^{st}$ new AID information, which is to be newly assigned to the $1^{st}$ station, to the $1^{st}$ station, and transmitting a $2^{nd}$ frame containing a $1^{st}$ old AID information of the $1^{st}$ station and the $1^{st}$ new AID information to the $2^{nd}$ station using an old AID information of the $2^{nd}$ station.

To further achieve these and other advantages and in accordance with the purpose of the present invention, as embodied and broadly described, a station device for changing an AID (association identification) in the course of performing a direct communication with a counterpart station (STA) according to a further embodiment of the present invention includes a transceiver configured to transceive a wireless signal and a processor configured to transmit an update request frame containing a new AID information to the counterpart station if receiving a reassignment response frame containing the new AID information from an AP (access point).

To further achieve these and other advantages and in accordance with the purpose of the present invention, as embodied and broadly described, an access point (AP) device, which changes AID (association identification) of a $1^{st}$ station performing a direct communication with a $2^{nd}$ station (STA), according to another further embodiment of the present invention includes a transceiver configured to transceive a wireless signal and a processor, if receiving a reassignment request frame containing an old AID information of the $2^{nd}$ station from the $1^{st}$ station, transmitting a $1^{st}$ frame containing a $1^{st}$ new AID information, which is to be newly assigned to the $1^{st}$ station, to the $1^{st}$ station, the processor configured to transmit a $2^{nd}$ frame containing a $1^{st}$ old AID information of the $1^{st}$ station and the $1^{st}$ new AID information to the $2^{nd}$ station.

Advantageous Effects

According to one embodiment of the present invention, an enhanced method of changing AID in a wireless communication system, and preferably, in a WLAN system and apparatus therefor can be provided.

According to one embodiment of the present invention, a method for, when an AID of a specific station is changed, a counterpart station directly communicating with the specific station to recognize the changed AID of the specific station and apparatus therefor can be provided.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 7 shows a format of an action field.

FIG. 19 is a diagram to describe RTS and CTS.

FIG. 26 is a diagram for one example of a structure of an AID assignment frame in the same group for changing AID of STA in the same group.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

The General of System

Figure 1:
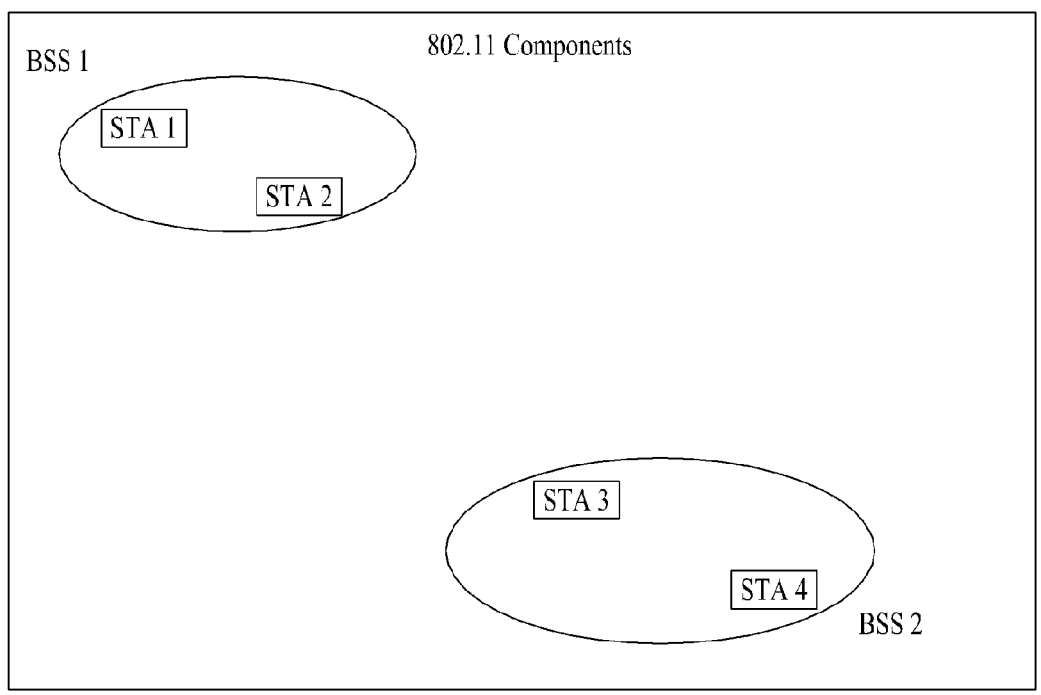
FIG. 1 is a diagram for one example of a structure of IEEE 802.11 system to which the present invention is applicable.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Figure 2:
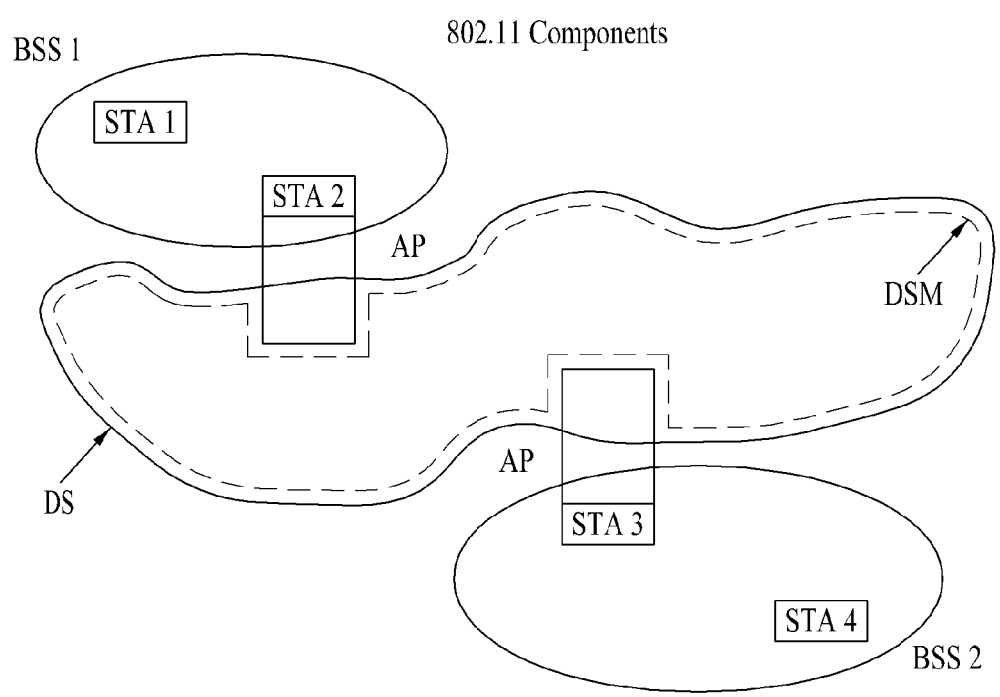
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DSM), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Once a controlled port is authenticated, a transmitted data (or frame) can be forwarded to a DS.

Figure 3:
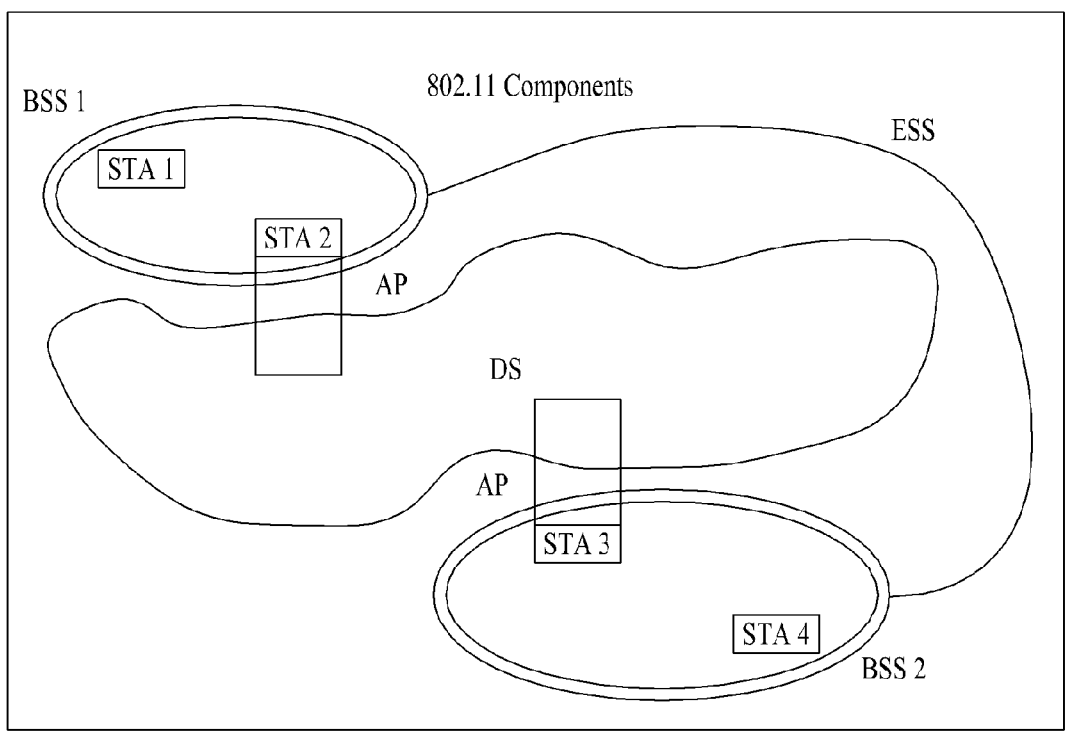
FIG. 3 is a diagram for a further example of a structure of IEEE 802.11 system to which the present invention is applicable.

FIG. 3 is a diagram for a further example of a structure of IEEE 802.11 system to which the present invention is applicable. FIG. 3 conceptionally shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two different access and security policies are necessary at the same location, and the like.

Figure 4:
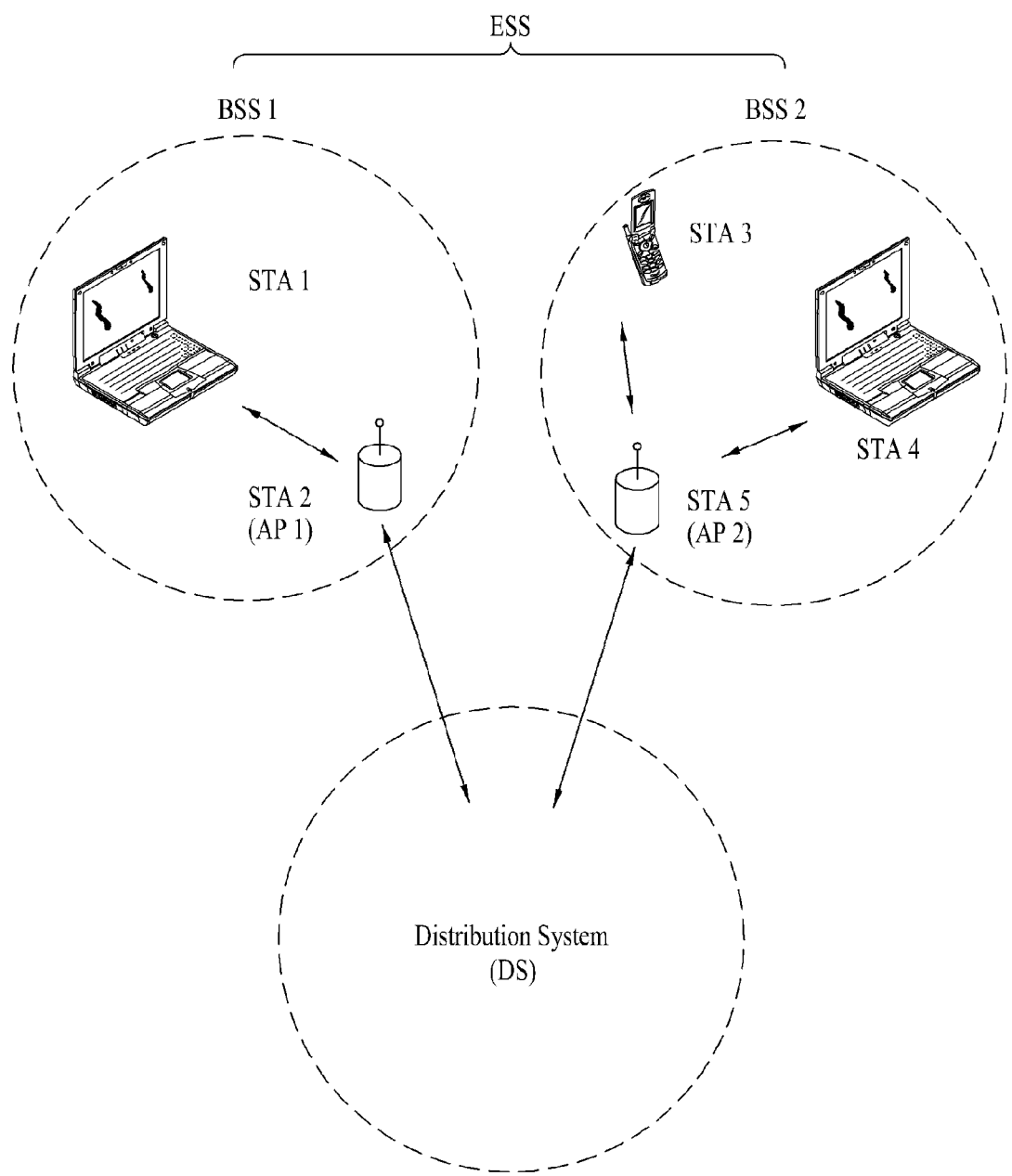
FIG. 4 is a diagram for one example of a structure of WLAN system.

FIG. 4 is a diagram for one example of a structure of WLAN system. In particular, FIG. 4 shows one example of BSS in DS-included infrastructure.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to one of a Base Station (BS), a Node-B, an evolved Node-B (eNB), a Base Transceiver System (BTS), a Femto BS and the like in other wireless communication fields.

Figure 5:
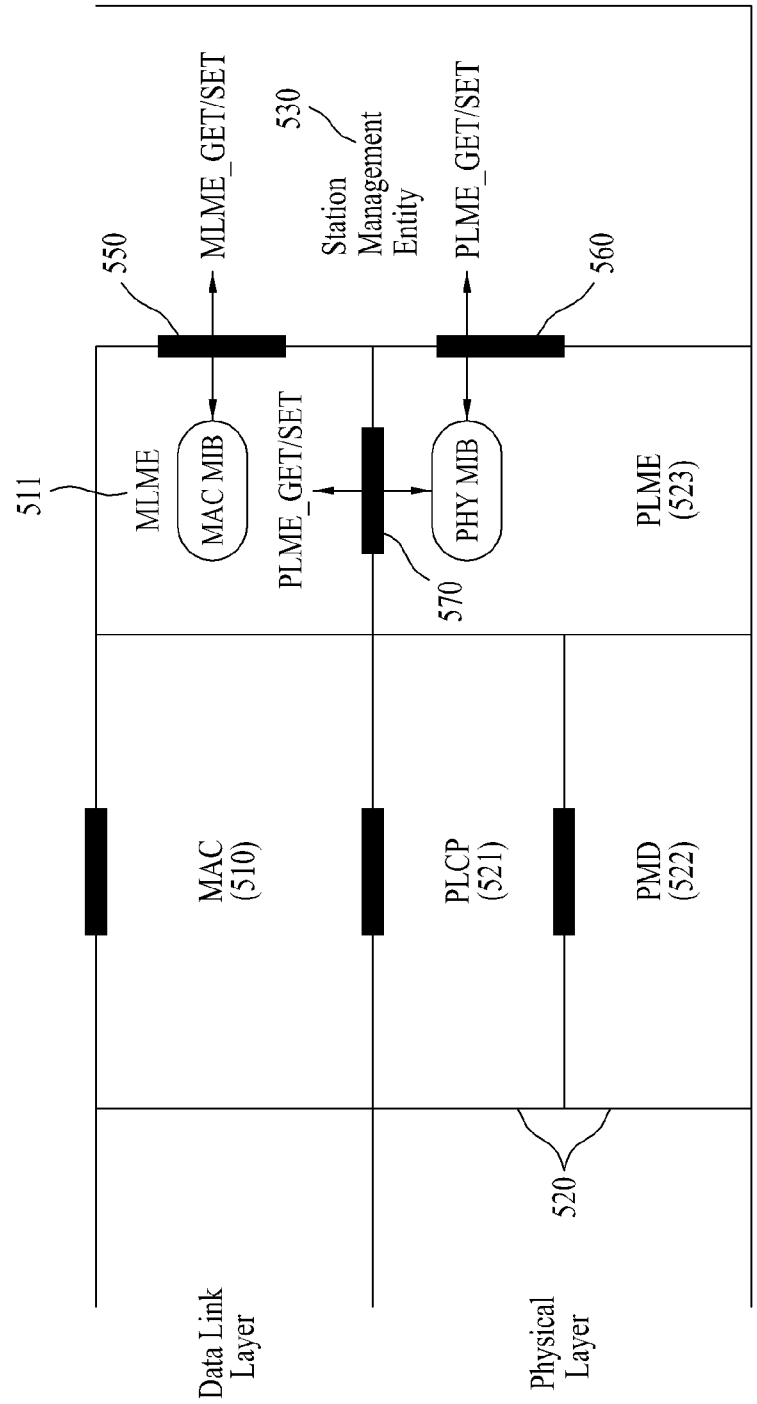
FIG. 5 is a diagram for one example of the structure of a data link layer and a physical layer on IEEE 802.11 system to which the present invention is applicable.

FIG. 5 is a diagram for one example of the structure of a data link layer and a physical layer on IEEE 802.11 system to which the present invention is applicable.

Referring to FIG. 5, a physical layer 520 can include a PLCP entity (Physical Layer Convergence Procedure Entity) 521 and a PMD entity (Physical Medium Dependent Entity) 522. The PLCP entity 521 plays a role in connecting a MAC sublayer 510 and a data frame to each other. The PMD entity 522 plays a role in transceiving data with at least two STAs by wireless using OFDM.

Both of the MAC sublayer 510 and the physical layer 520 can include conceptional management entities that can be named MLME (MAC Sublayer Management Entity) 511 and PLME (Physical Layer Management Entity) 523, respectively. These entities 511 and 521 provide a layer management service interface through an operation of a layer management function.

In order to provide an accurate MAC operation, SME (Station Management Entity) 530 may exist in each user equipment. The SME 530 is a management entity independent from each layer and collects layer based state information from various layer management entities or sets values of specific parameters of the respective layers. The SME 530 can perform such a function instead of general system management entities and can implement a standard management protocol.

The above-mentioned various entities can mutually interact with each other in various ways. In the example shown in FIG. 5, a GET/SET primitive is exchanged. A primitive XX-GET.request is used to request a value of MIB attribute (management information base attribute. If a state is 'SUCCESS', a primitive XX-GET.confirm returns a value of the corresponding MIB attribute. In other cases, an error indication is marked on a state field and then returned. A primitive XX-SET.request is used to make a request for setting a designated attribute as a given value. If the MIB attribute means a specific operation, this request makes a request for executing the corresponding specific operation. If a state is 'SUCCESS', a primitive XX-SET.confirm means that the designated MIB attribute is set to the requested value. In other cases, a state field indicates an erroneous situation. If this MIB attribute means a specific operation, the corresponding primitive can confirm that the corresponding operation has been performed.

Referring to FIG. 5, the MLME 511 & the SME 530 and the PLME 523 & the SME 530 can exchange various primitives through MLME_SAP (MLME_Service Access Point) 550 and PLME_SAP (PLME_Service Access Point) 560, respectively. And, the MLME 511 and the PLME 523 can exchange primitives through MLME-PLME_SAP (MLME-PLME_Service Access Point) 570.

Link Setup Process

Figure 6:
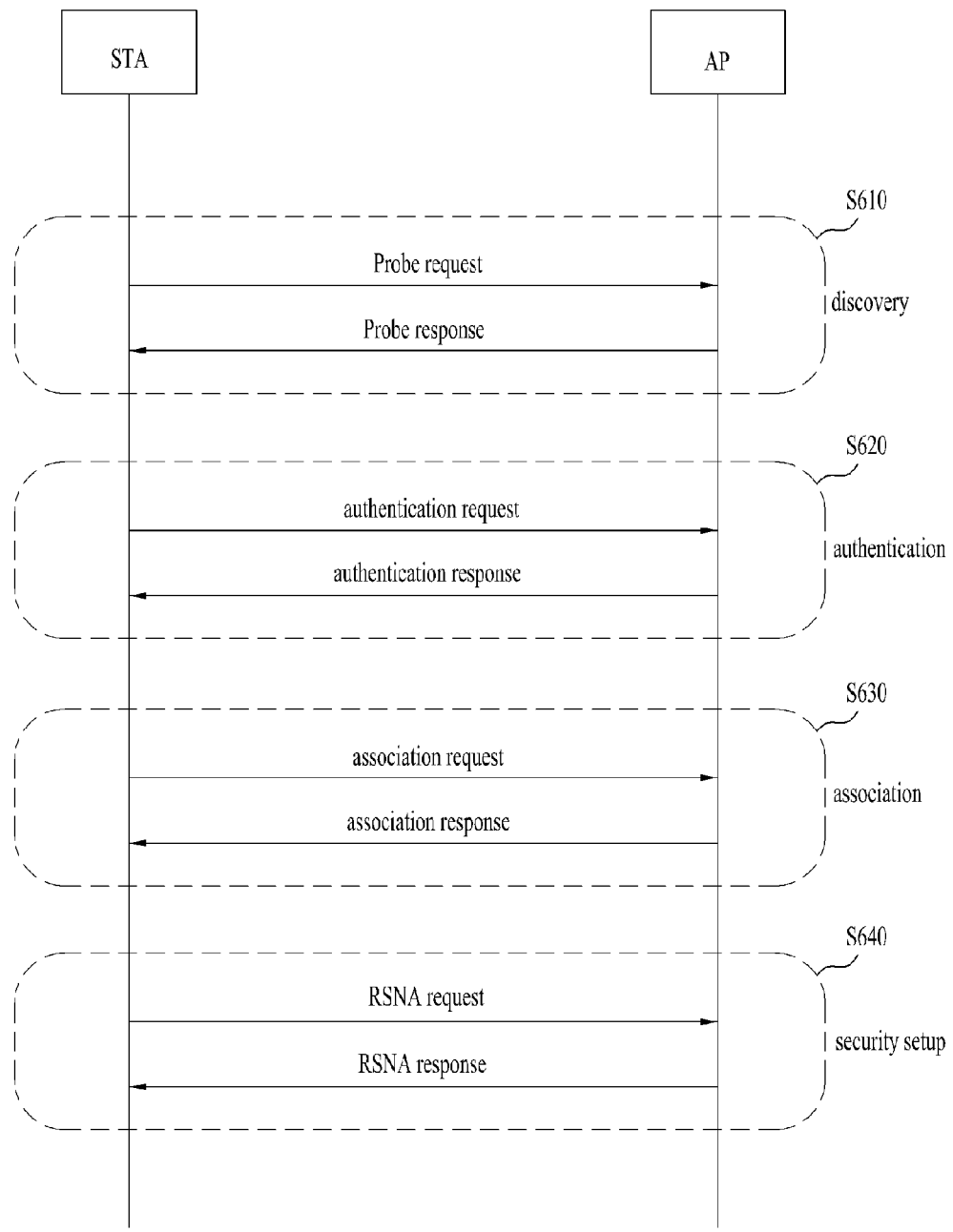
FIG. 6 is a diagram to describe a general link setup process in a WLAN system to which the present invention is applicable.

FIG. 6 is a diagram to describe a general link setup process in a WLAN system to which the present invention is applicable.

In order for an STA to transceive data by setting up a link with a network, the STA should discover a network, perform authentication, establish association, perform an authentication procedure for security, and the like. A link setup process can be named a session initiation process or a session setup process. And, the discovery, authentication, association and security setup steps of the link setup process can be commonly named an association process.

One example of a link setup process is described with reference to FIG. 6 as follows.

In a step S610, an STA can perform a network discovery action. The network discovery action can include a scanning action of the STA. In particular, in order to access the network, the STA should discover a joinable network. The STA needs to identify a compatible network before joining a wireless network. In doing so, a process for identifying a network existing in a specific area is called a scanning.

The scanning can be categorized into an active scanning or a passive scanning.

FIG. 6 shows a network discovery action including an active scanning process. In the active scanning, an STA performing a scanning transmits a probe request frame for searching what kind of AP exists nearby while switching channels and then waits for a response to the transmitted probe request frame. A responder transmits a probe response frame in response to the probe request frame to the STA having transmitted the probe request frame. In this case, the responder may include an STA having transmitted a beacon frame last in a BSS of a scanned channel. In the BSS, since an AP transmits the beacon frame, the AP becomes the responder. In IBSS, since each of STAs within the IBSS transmits the beacon frame in turn, the responder is not fixed. For instance, if an STA transmits a probe request frame on channel #1 and then receives a probe response frame on the channel #1, the STA saves BBS related information contained in the received probe response frame and is then able to perform a scanning in the same manner by switching to a next channel (e.g., channel #2) [i.e., transmission of a probe request on channel #2 and reception of a probe response on channel #2].

The scanning action may be performed by the passive scanning scheme [not shown in FIG. 6]. In the passive scanning, an STA performing the scanning waits for a beacon frame while switching channels. The beacon frame is one of management frames in IEEE 802.11 and is periodically transmitted in order to announce an existence of a wireless network and to enable an STA performing a scanning to discover and join the corresponding wireless network. In a BSS, an AP plays a role in transmitting a beacon frame periodically. In an IBSS, each of STAs within the IBSS transmits a beacon frame in turn. If an STA performing a scanning receives a beacon frame, the corresponding STA saves an information on a BSS included in the beacon frame and then records a beacon frame information on each channel while switching to another channel. Having received the beacon frame, the STA saves a BSS related information contained in the received beacon frame and is then able to perform a scanning on a next channel by switching to the next channel.

Comparing an active scanning and a passive canning to each other, the active scanning is more advantageous than the passive scanning in delay and power consumption.

After the STA has discovered the network, an authentication process can be performed in a step S620. This authentication process can be named a first authentication process to be clearly discriminated from a security setup action in a step S640 described later.

The authentication process includes a following process. First of all, the STA transmits an authentication request frame to the AP. Secondly, the AP transmits an authentication response frame to the STA in response to the authentication request frame. The authentication frame used for the authentication request/response corresponds to a management frame.

The authentication frame can contain informations on an authentication algorithm number, an authentication transaction sequence number, a status code, a challenge text, an RSN (robust security network), a finite cyclic group, and the like. These informations correspond to some example of informations containable in the authentication request/response frame, can be substituted with other information, and may further include additional informations.

The STA can transmit an authentication request frame to the AP. Based on the information contained in the received authentication request frame, the AP can determine whether to allow the authentication of the corresponding STA. The AP is able to provide a result of the authentication processing to the STA through an authentication response frame.

After the STA has been successfully authenticated, an association process can be performed in a step S630. The association process includes a following process. First of all, the STA transmits an association request frame to the AP. Secondly, the AP transmits an association response frame to the STA in response to the association request frame.

For instance, the association request frame can include informations related to various capabilities, e.g., informations on a beacon listen interval, a service set identifier (SSID), supported rates, supported channels, an RSN, a mobility domain, supported operating classes, a TIM (traffic indication map) broadcast request, an interworking service capability and the like.

For instance, the association response frame can include informations related to various capabilities, e.g., informations on a status code, an AID (association ID), supported rates, an EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS (quality of service) map and the like.

These informations correspond to some example of informations containable in the authentication request/response frame, can be substituted with other information, and may further include additional informations.

After the STA has been successfully associated with the network, a security setup process can be performed in a step S640. The security setup process in the step S640 may be called an authentication process through RSNA (robust security network association) request/response. The authentication process of the step S620 may be named a first authentication process, while the security setup process of the step S640 may be simply named an authentication process.

The security setup process of the step S640 can include a private key setup process by 4-way handshaking through EAPOL (extensible authentication protocol over LAN) for example. And, the security setup process can be performed by a security scheme that is not defined in IEEE 802.11 Standard.

Direct Link Setup Process

In order to support a direct link setup between STAs (hereinafter named QSTAs) supportive of QoS, the QSTAs should be able to deliver management action frames such as DLS (direct link setup) request, DLS response, DLS teardown and the like by themselves without the help of AP. TDLS (tunneled direct link setup) scheme is a scheme of transmitting the management action frames such as the DLS request, the DLS response, the DLS teardown and the like in a manner of encapsulating them and enables intelligent negotiation between STAs and reduction of network congestion.

An actin field provides a mechanism for clearly stating extended management actions. This is described in detail with reference to FIG. 7 as follows.

FIG. 7 shows a format of an action field. Referring to FIG. 7, an action field can include a category field and a detailed action field (or, named 'TDLS action field').

Several action frame formats are defined to support TDLS. TDLS action field located right next to a category field discriminates TDLS action frame formats. A value of a TDLS action field related to each frame format within TDLS category is exemplarily shown in Table 1.

TABLE 1

| TDLS Action field value | Meaning |
|---|---|
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS Peer Traffic Response |
| 10 | TDLS Discovery Request |
| 11-255 | Reserved |

Figure 8:
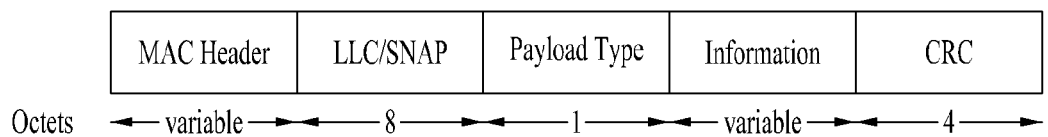
FIG. 8 shows a configuration of TDLS frame.

FIG. 8 shows a configuration of TDLS frame. By assigning a new value to Ether type of LLC/SNAP header shown in FIG. 8, it is able to announce that a data frame corresponds to a TDLS frame.

A configuration of a payload type field shown in FIG. 8 is exemplarily shown in Table 2.

TABLE 2

| Protocol name | Payload type | Subclause |
|---|---|---|
| Remote Request/Response | 1 | 12.10.3 (Remote Request/Response frame definition) |
| TDLS | 2 | 10.22.2 (TDLS payload) |
| Reserved | 3-255 | |

Figure 9:
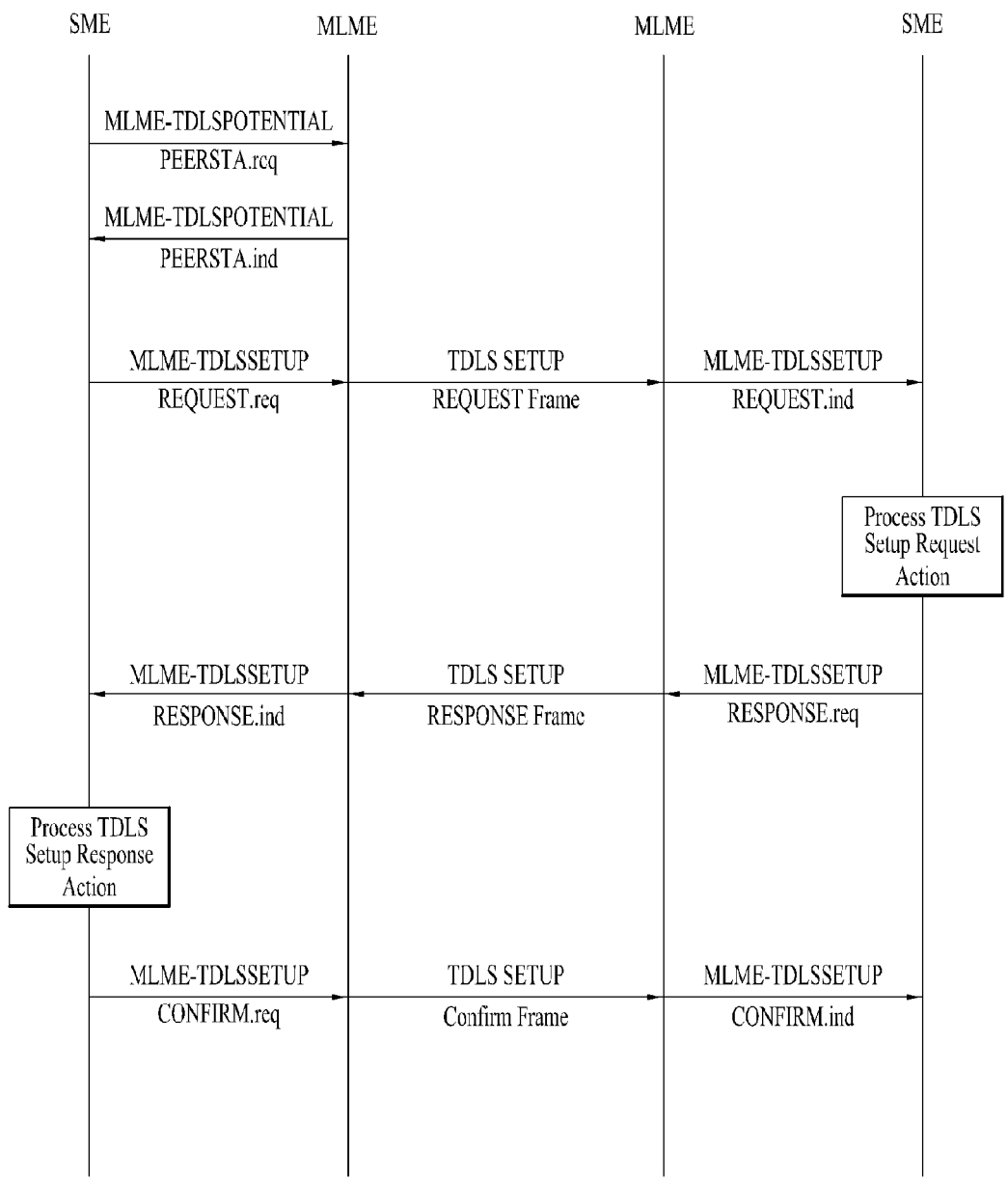
FIG. 9 shows a TDLS direct link setup process.

MLME primitives can support signaling of TDLS. FIG. 9 shows a TDLS direct link setup process. Yet, FIG. 9 shows one example of basic processes only, which does not mean all availabilities of a protocol without any omissions.

Evolution of WLAN

IEEE 802.11n exists as a technology standard stipulated relatively recently in order to overcome the limits put on a communication speed in a wireless LAN. The objects of IEEE 802.11n are to increase a speed and reliability of a network and to extend an operating distance of a wireless network. In particular, IEEE 802.11n supports high throughput (HT) of which data processing speed is equal to or greater than maximum 540 Mbps. In order to minimize transmission error and optimize a data speed or rate, IEEE 802.11n is based on MIMO (multiple inputs and multiple outputs) technology that uses multiple antennas for a transmitting unit end and a receiving end unit both.

As WLAN is supplied widely and actively and applications using WLAN are diversified, the necessity for a new WLAN system to support a throughput higher than a data processing speed supported by IEEE 802.11n is increasingly rising. A next generation WLAN system supportive of VHT (very high throughput) is a next version (e.g., IEEE 802.11ac) of IEEE 802.11n WLAN system and corresponds to one of IEEE 802.11 WLAN systems proposed recently and newly to support a data processing sped over 1 Gbps at a MAC service access point (SAP).

A next WLAN system supports a transmission of MU-MIMO (multi user multiple input multiple output) for enabling a plurality of STAs to access a channel simultaneously in order to efficiently use wireless channels. According to MU-MIMO transmission scheme, an AP is able to simultaneously transmit a packet to at least one or more MIMO-paired STAs. And, there has been much discussion about supporting a WLAN system operation on a whitespace. For instance, the introduction of a WLAN system on a TV whitespace (ES) such as a frequency band (e.g., 54~698 MHz band) in idle state due to the digitalization of analog TV has been discussed as IEEE 802.11af Standard. Yet, this is just one example. The whitespace can be regarded as a licensed band that can be incumbently used by a licensed user. In this case, the licensed user means a user that is licensed to use a licensed band. And, the licensed user can be called one of a licensed device, a primary user, an incumbent user and the like.

For instance, an AP and/or STA operation on WS should provide a protection function for a licensed user. For instance, in case that a licensed user such as a microphone is already using a specific WS channel corresponding to a frequency band divided on regulation to have a specific bandwidth on a WS band, an AP and/or STA is unable to use the frequency band amounting to the corresponding WS channel to protect the licensed user. If a licensed user uses a frequency band currently used for a current frame transmission and/or reception, an AP and/or STA should stop using the corresponding frequency band.

Hence, the AP and/or STA should precedently perform a procedure for checking whether a use of a specific frequency band within a WS band is available, i.e., whether a licensed user exists on the frequency band. Checking whether the licensed user exists on the specific frequency band is called a spectrum sensing. As a spectrum sensing mechanism, one of energy detection, signature detection and the like is utilized. If a strength of a received signal is equal to or greater than a predetermined value, it is able to determine that the licensed user currently uses the specific frequency band. If a DTV preamble is detected, it is able to determine that the licensed user currently uses the specific frequency band.

M2M (machine-to-machine) communication technology is currently discussed as a next generation communication technology. In IEEE 802.11 WLAN system, a technology standard for supporting M2M communication is developed as IEEE 802.11ah. The M2M communication means a communication system that includes at least one machine and may be called MTC (machine type communication) or the like. In this case, 'machine' means an entity that does not require direct human manipulation or intervention. For instance, a device such as a wireless communication module installed meter and a wireless communication module installed auto vending machine may correspond to one example of a machine as well as a user device such as a smartphone that can perform a communication by automatically accessing a network without user's manipulation/intervention. The M2M communication can include one of a communication between devices (e.g., a D2D (device-to-device) communication), a communication between a device and a server (e.g., an application server), and the like. As one example of the device-to-server communication, there is a communication between an auto vending machine and a server, a communication between a POS (point of sale) device and a server, a communication between an electricity/gas/water meter and a server, or the like. Besides, M2M communication based applications can include security, transportation, health case and the like. Considering the properties of the application examples, M2M communication should be generally able to support transmission/reception of a small amount of data occasionally in an environment in which many devices exist.

In particular, M2M communication should be able to support a large number of STAs. Although a currently defined WLAN system assumes a case that maximum 207 STAs are associated with a single AP, methods for supporting a case that a number of STAs more than 2007 STAs are associated with a single AP are currently discussed in M2M communication. Moreover, in M2M communication, it is estimated that there will be many applications that support/require a low transmission speed. In order to support this smoothly, for instance, in WLAN system, an STA is able to recognize a presence or non-presence of data, which is to be transmitted to the STA, based on TIM (traffic indication map) element. And, methods for reducing a bitmap size of TIM are currently discussed. Moreover, in M2M communication, it is estimated that there will be many traffics that have a considerably long transmission/reception interval. For instance, like an electricity/gas/water used amount, it is required to transceive a considerably small amount of data in each long periodicity (e.g., 1 month, etc.). Hence, although the number of STAs associable with a single AP increases highly, methods for efficiently supporting a case that the number of STAs having a data frame supposed to be received from an AP in a single beacon periodicity is considerably small are currently discussed.

Thus, the WLAN technology is evolving fast and technologies for a direct link setup, an enhancement of media streaming performance, support of a fast and/or large-scale initial session setup, support of an extended bandwidth and operating frequency, and the like are currently developed.

Frame Structure

Figure 10:
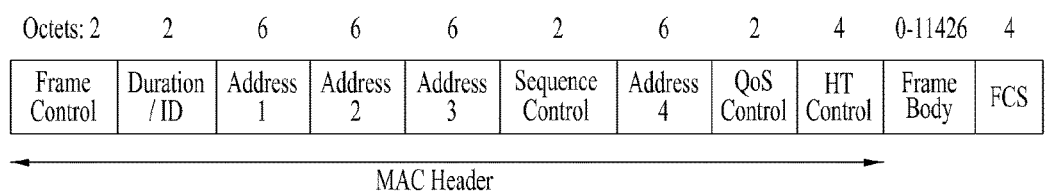
FIG. 10 shows one example of a MAC frame format of IEEE 802.11 system to which the present invention is applicable.

FIG. 10 shows one example of a MAC frame format of IEEE 802.11 system to which the present invention is applicable.

Referring to FIG. 10, a MAC frame format includes a MAC header (MHR), a MAC payload and a MAC footer (MFR). The MHR is defined as a region including a frame control field, a duration/identifier (duration/ID) field, an address 1 field, an address 2 field, an address 3 field, a sequence control field, an address 4 field, a QoS control field, and an HT control field. A frame body field is defined as a MAC payload. Data desired to be transmitted by an upper layer is located in the frame body field. And, the frame body field has a variable size. A frame check sequence (FCS) field is defined as a MAC footer and is used for an error search of a MAC frame.

The first 3 fields (i.e., the frame control field, the duration/ID field, and the address 1 field) configure a minimum frame format and exist in all frames. And, other fields can exist in a specific frame type only.

Informations included in the respective fields mentioned in the above description can follow the definition of IEEE 802.11 system. The respective fields mentioned in the foregoing description correspond to examples of the fields that can be included in the MAC frame, may be substituted with other fields, or may further include additional fields.

Figure 11:
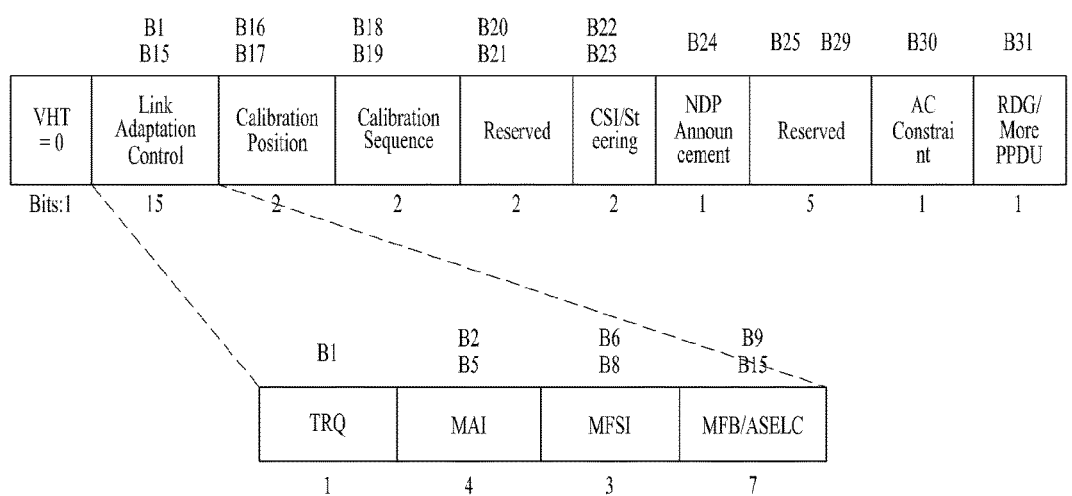
FIG. 11 shows one example of HT format of HT Control field in MAC frame according to FIG. 10.

FIG. 11 shows one example of HT format of the HT control field in the MAC frame according to FIG. 10.

Referring to FIG. 11, the HT control field may include a VHT subfield, a link adaptation subfield, a calibration position subfield, a calibration sequence subfield, a CSI/Steering (channel state information/steering) subfield, an NDP (null data packet) announcement subfield, an AC (access category) constraint subfield, an RDG/More PPDU (reverse direction grant/More PPDU) subfield, a reserved subfield, and the like.

The link adaption subfield can include a TRQ (training request) subfield, an MAI [MCS (modulation and coding scheme) request or ASEL (antenna selection) indication] subfield, an MFSI (MCS feedback sequence identifier) subfield, an MFB/ASELC (MCS feedback and antenna selection command/data) subfield, and the like.

If a request for a sounding PPDU transmission is made to a responder, the TRQ subfield is set to 1. If a request for a sounding PPDU transmission is not made to a responder, the TRQ subfield is set to 0. If the MAI subfield is set to 14, it means an antenna selection (ASEL) indication and the MFB/ASELC subfield is interpreted as antenna selection command/data. Otherwise, the MAI subfield indicates an MCS request and the MFB/ASELC subfield is interpreted as an MCS feedback. When the MAI subfield indicates an MCS request (MRQ), if any MCS feedback is not requested, the MAI subfield is set to 0. If the MCS feedback is requested, the MAI subfield is set to 1. The sounding PPDU means PPDU that carries a training symbol usable for channel estimation.

The respective subfields mentioned in the above description correspond to examples of the subfields that can be included in the HT control field, may be substituted with other subfields, or may further include additional subfields.

Figure 12:
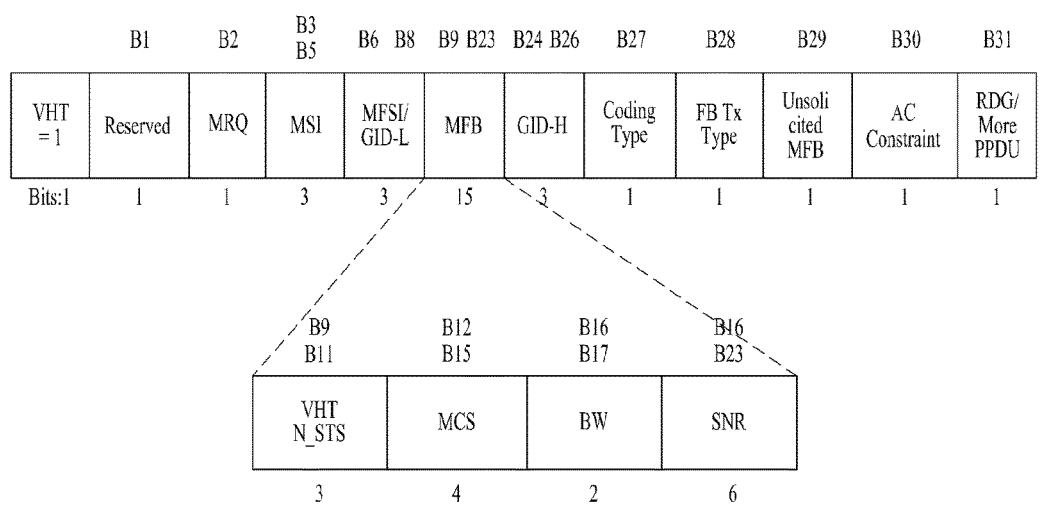
FIG. 12 shows one example of VHT format of HT Control field in MAC frame according to FIG. 10.

FIG. 12 shows one example of VHT format of the HT control field in the MAC frame according to FIG. 10.

Referring to FIG. 12, the HT control field may include a VHT subfield, an MRQ subfield, an MSI subfield, an MCS feedback sequence indication/group ID least significant bit (MFSI/GID-L(LSB of Group ID)) subfield, an MFB subfield, a group ID most significant bit (GID-H (MSB of Group ID)) subfield, a coding type subfield, an MFC response transmission type (FB Tx Type: Transmission type of MFB response) subfield, an unsolicited MFB subfield, an AC constraint subfield, an RDG/More PPDU subfield, and the like. And, the MFB subfield may include a VHT N_STS (Number of space time streams) subfield, an MCS subfield, a BW (bandwidth) subfield, an SNR (Signal to Noise Ratio) subfield, and the like.

Table 3 shows descriptions of the respective subfields in the VHT format of the HT control field.

TABLE 3

| Subfield | Meanings | Definitions |
|---|---|---|
| MRQ | MCS request | This is set to 1 if an MCS feedback (solicited MFB) is requested. Otherwise, this is set to 0. |
| MSI | MRQ sequence identifier | If MRQ subfield is set to 1, MSI subfield includes a sequence number ranging from 0 to 6. If MRQ subfield is set to 0, MSI subfield is reserved. |
| MFSI/GID-L | MFB sequence identifier/LSB of Group ID | Of unsolicited) MFB subfield is set to 0, MFSI/GID-L subfield includes a reception value of MSI included in the frame indicated by MFB information. If unsolicited MFB subfield is set to 1, MFSI/GID-L subfield includes 3 LSBs of group ID of PPDU indicated by unsolicited MFB. |
| MFB | VHT N_STS, MCS, BW, SNR feedback | MFB subfield indicates recommended MF. If MCS = 15 and VHT N_STS = 7, it indicates that no feedback exists. |
| GID-H | MSB of Group ID | If unsolicited MFB subfield is set to 1, GID-H subfield includes 3 MSBs of group ID of PPDU indicated by unsolicited MFB. |
| Coding Type | Coding type of MFB response | If unsolicited MFB subfield is set to 1, coding type subfield includes coding information (e.g., 1 in case of BCC (binary convolutional code), 0 in case of LDPC (low-density parity check). Otherwise, this subfield is reserved. |
| FB Tx Type | Transmission type of MFB response | If unsolicited MFB subfield is set to 1 and FB Tx Type subfield is set to 0, unsolicited MFB indicates one of a transmit diversity using unbeamformed VHT PPDU and a transmit diversity using STBC (space-time block coding) VHT PPDU. If unsolicited MFB subfield is set to 1 and FB Tx Type subfield is set to 1, unsolicited MFB indicates beamformed SU-MIMO (Single User MIMO) VHT PPDU. Otherwise, this subfield is reserved. |

TABLE 3-continued

| Subfield | Meanings | Definitions |
| --- | --- | --- |
| Unsolicited MFB | Unsolicited MCS feedback indicator | If MFB is not a response to MRQ, this subfield is set to 1. If MFB is a response to MRQ, this subfield is set to 0. |
| AC Constraint | | If a response to a reverse direction grant (RDG) includes a data frame from a prescribed TID (traffic identifier), this subfield is set to 0. If a response to a reverse direction grant (RDG) includes a frame from the same AC of a last data frame received from a same reverse direction (RD) initiator), this subfield is set to 1. |
| RDG/More PPDU | | If RDG/More PPDU subfield is set to 0, it indicates that there is no reverse direction grant (RDG) in case of a transmission from a reverse direction (RD) initiator or that PPDU carrying MAC frame is a final transmission in case of a transmission from a reverse direction (RD) responder. If RDG/More PPDU subfield is set to 1, it indicates that a reverse direction grant (RDG) exists in case of a transmission from a reverse direction (RD) initiator or that PPDU carrying a MAC frame is followed by another PPDU in case of a transmission from a responder. |

The respective subfields mentioned in the above description correspond to examples of the subfields that can be included in the HT control field, may be substituted with other subfields, or may further include additional subfields.

Meanwhile, a MAC sublayer delivers a MAC protocol data unit (MPDU) to a physical layer as a physical (PHY) service data unit (PSDU). A PLCP entity generates PLCP protocol data unit (PPDU) by attaching a physical (PHY) header and a preamble to the received PSDU.

Figure 13:
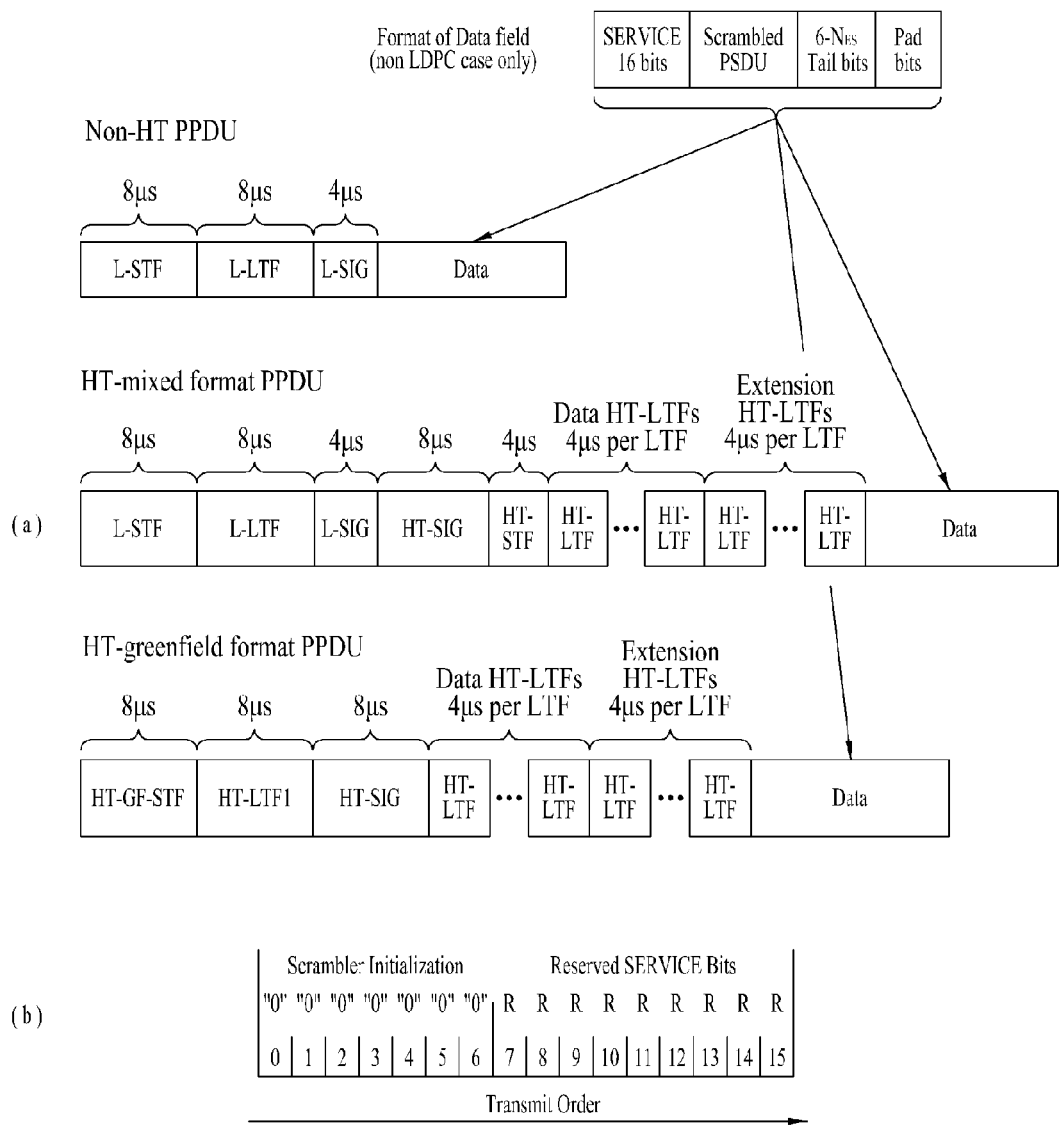
FIG. 13 shows one example of PPDU frame format of IEEE 802.11n system to which the present invention is applicable.

FIG. 13 shows one example of PPDU frame format of IEEE 802.11n system to which the present invention is applicable.

FIG. 13(a) shows one example of PPDU frames according to a non-HT format, an HT mixed format and an HT-greenfield format.

The non-HT format indicates a frame format for an existing legacy system (IEEE 802.11 a/g) STA. The non-HT format PPDU includes a legacy format preamble consisting of L-STF (Legacy-Short Training field), L-LTF (Legacy-Long Training field) and L-SIG (Legacy-Signal) field.

The HT mixed format allows a communication of an existing legacy system STA and also indicates a frame format for IEEE 802.11n STA. The HT mixed format PPDU includes a legacy format preamble consisting of L-STF, L-LTF and L-SIG and an HT format preamble consisting of HT-STF (HT-Short Training field), HT-LTF (HT-Long Training field) and HT-SIG (HT-Signal) field. Since the L-STF, L-LTF and L-SIG mean the legacy fields for backward compatibility), a configuration from L-STF to L-SIG is identical to that of the non-HT format. And, an STA is able to recognize the mixed format PPDU using a following HT-SIG field.

The HT-Greenfield format is not compatible with an existing legacy system and indicates a frame format for IEEE 802.11n ST. The HT-Greenfield format PPDU includes a greenfield preamble consisting of HT-GF-STF (HT-Greenfield-STF), HT-LTF1, HT-SIG and at least one HT-LTF.

The data field includes a SERVICE field, PSDU, tail bit, and pad bit. All bots of the data field are scrambled.

FIG. 13(b) shows a service field included in the data field. The service field retains 16 bits. The bits are numbered by 0 to 15. And, the bits are sequentially transmitted by starting with the bit #0. The bits #0 to #6 are set to 0 and used to synchronize a descrambler within a receiving end.

Figure 14:
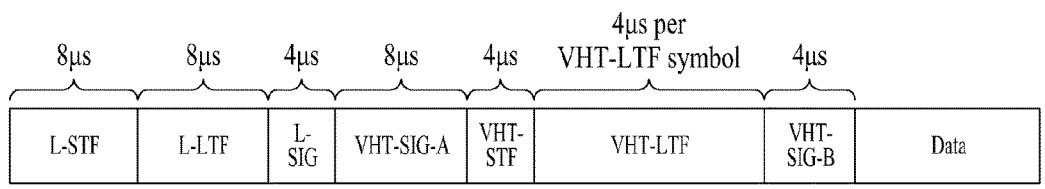
FIG. 14 shows one example of VHT PPDU frame format of IEEE 802.11ac system to which the present invention is applicable.

FIG. 14 shows one example of VHT PPDU frame format of IEEE 802.11ac system to which the present invention is applicable.

Referring to FIG. 14, VHT format PPDU includes a legacy format preamble consisting of L-STF, L-LTF and L-SIG and a VHT format preamble consisting of VHT-SIG-A, HT-STF and HT-LTFs before a data field. Since the L-STF, L-LTF and L-SIG mean the legacy fields for backward compatibility, a configuration from the L-STF to the L-SIG is identical to that of the non-HT format and an STA is able to recognize the VHT format PPDU using a following VHT-SIG field.

The L-STF is the field for frame detection, AGC (Auto Gain Control), diversity detection, coarse frequency/time synchronization, and the like. The L-LTF is the field for fine frequency/time synchronization, channel estimation and the like. The L-SIG is the field for legacy control information transmission. The VHT-SIG-A is the VHT field for common control information transmission of VHT STAs. The VHT-STF is the field for AGC for MIMO and a beamformed stream. The VHT-LTFs is the field for channel estimation for MIMO and a beamformed stream. And, the VHT-SIG-B is the field for transmitting a control information specified for each STA.

Figure 15:
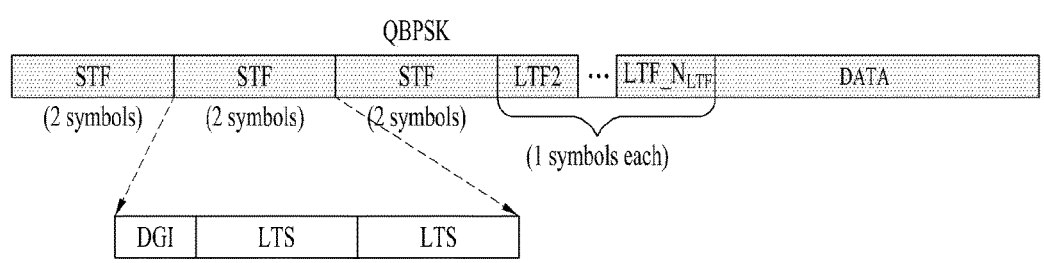
FIG. 15 shows one example of a general frame format for a single user (SU) open-loop packet of IEEE 802.11 system to which the present invention is applicable.

FIG. 15 shows one example of a general frame format for a single user (SU) open-loop packet of IEEE 802.11 system to which the present invention is applicable. A general format for a single user (SU) open-loop has a structure similar to that of a greenfield preamble of IEEE 802.11n system. In particular, referring to FIG. 15, a frame format for a single user (SU) open-loop is configured with STF, LTF1, SIG, at least one or more LTFs, and at least one or more data fields.

The STF field uses the same tone (e.g., 2 MHz) defined in IEEE 802.11n. And, the STF uses 12 non-zero tones. The non-zero tones are mapped to space-time streams using a $1^{st}$ column of P matrix by the same method of IEEE 802.11n GF preamble.

The LTF field occupies 2 MHz or more and has the same FFT size of VHTLTF signal corresponding to IEEE 802.11ac packet.

The SIG field uses 2 symbols modulated respectively by Q-BPSK like a greenfield preamble of IEEE 802.11n. Each of 48 data tones occupies a subband amounting to about 2 MHz and is modulated using IEEE 802.11n MCS0 or IEEE 802.11ac MCS0. Multiple data tones are mapped to multiple space-time streams using a $1^{st}$ column of P matrix by the same method of IEEE 802.11n GF preamble.

A content of the SIG field occupying 2 MHz or more can be classified into SIGA or SIGB. The SIGA can be used in both a single user (SU) environment and a multi-user (MU) environment. Yet, the SIGB can be used only in the multi-user environment.

A structure of the SIGA can be changed through the discrimination between SU and MU by autodetection. Table 4 shows sizes of fields within SIGA in a single user environment and a multi-user environment.

TABLE 4

| Field of SIG | SU(Bits) | MU(Bits) |
|---|---|---|
| Length/Duration | 9 | 9 |
| MCS | 4 | |
| BW | 2 | 2 |
| Aggregation | 1 | |
| STBC | 1 | 1 |
| Coding | 2 | 5 |
| SGI | 1 | 1 |
| GID | | 6 |
| Nsts | 2 | 8 |
| PAID | 9 | |
| Ack Indication | 2 | 2 |
| Reserved | 5 | 4 |
| CRC | 4 | 4 |
| Tail | 6 | 6 |
| Total | 48 | 48 |

Length/Duration field is a symbol unit when Aggregation is 1 (ON). Length/Duration field is a byte unit when a packet size of Mandate AMPDU (aggregated MAC protocol data unit) is greater than 511 bytes. And, Length/Duration field is a byte unit in a multi-user environment.

Nsts represents STS of 1~4 with 2 bits in a single user environment. Nsts represents STS of 0~3 for 4 users with 8 bits.

Coding indicates BCC/LDPC with 1 bit in a single user environment and also indicates an additional symbol with another bit for an LDPC encoding course. In a multi-user environment, Coding indicates BCC/LDPC of 4 clients with 4 bits like IEEE 802.11ac and also indicates with 1 bit whether an additional symbol is generated for a random user in encoding LDPC.

MCS is a 4-bit index in a single user environment. In a multi-user environment, MCS reuses 3 bits for 2~4 users as BCC/LDCP indicator in a manner similar to that of VHTSIGA of IEEE 802.11ac.

Aggregation can be mainly applied to a single user environment or may be preliminary in a multi-user environment.

CRC can be implemented with 4 bits sufficiently.

GID may be used with 6 bits in a multi-user environment. Yet, GID may be unnecessary in a single user environment.

PAID includes 9 bits but is unnecessary in a multi-user environment.

2 bits can be assigned for Ack Indication.

Table 5 shows a size of each field in SIGB according to a bandwidth (BW).

TABLE 5

| | Bits | | | |
|---|---|---|---|---|
| Field of SIG | BW: 2 MHz | BW: 4 MHz | BW: 8 MHz | BW: 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

Figure 16:
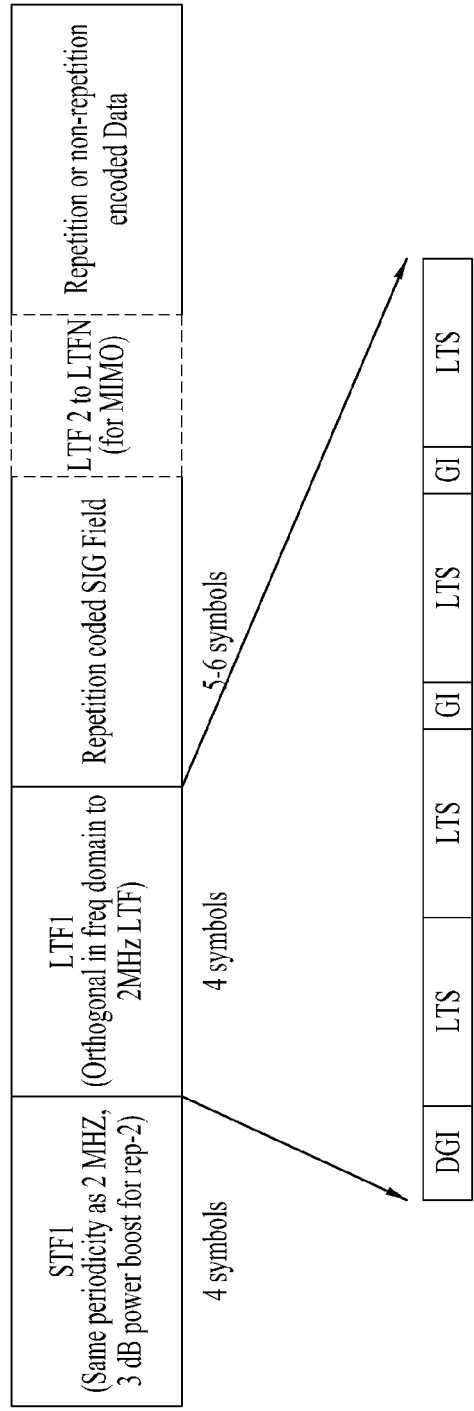
FIG. 16 is shows one example of a preamble format of 1-MHz bandwidth of IEEE 802.11ah system to which the present invention is applicable.

FIG. 16 is shows one example of a preamble format of 1-MHz bandwidth of IEEE 802.11ah system to which the present invention is applicable. Referring to FIG. 16, a preamble format having a bandwidth of 1 MHz includes STF1, LTF1, repetition coded SIG, at least one or more LTFs, and repetition or non-repetition encoded data field.

Table 6 is provided to describe fields of repetition coded SIG.

TABLE 6

| Field of SIG | Bits | Summary |
|---|---|---|
| STBC | 1 | Same as IEEE 802.11ac system |
| Num SS | 2 | Number of SS (Spatial streams) in a single user (SU) environment의 수 |
| SGI | 1 | Short Guard Interval |
| Coding | 2 | $1^{st}$ bit indicates a coding type (LDPC/BCC), $2^{nd}$ bit indicate ambiguity of LDCP $N^{th}$ symbol. |
| MCS | 4 | MCS |
| Aggregation | 1 | Signals use of AMPDU |
| Length | 9 | Symbol unit when Aggregation is On. Byte unit when Aggregation is Off and/or Mandate AMPDUdml packet size is equal to or greater than 511 bytes |
| Ack Indication | 2 | 00: ACK; 01: BA; 10: No Ack; 11: reserved |
| Reserved | 4 | |
| CRC | 4 | |
| Tail | 6 | |
| Total | 36 | |

Medium Access Mechanism

In WLAN system according to IEEE 802.11, a basic access mechanism of MAC (medium access control) is a CSMA/CA (carrier sense multiple access with collision avoidance) mechanism. The CSMA/CA mechanism may be called DCF (distributed coordination function) of IEEE 802.11 MAC and basically employees an access mechanism 'listen before talk'. According to an access mechanism of such a type, before initiating a transmission, an AP and/or STA can perform CCA (clear channel assessment) for sensing a radio channel or medium during a prescribed time interval (e.g., DIFS (DCF inter-frame space). As a result of the sensing, if it is determined that a medium is in idle status, the AP and/or STA starts a frame transmission through a corresponding medium. On the contrary, if it is detected that a medium is in occupied status, the corresponding AP and/or STA sets up a delay interval (e.g., a random backoff period) for a medium access instead of starting its own transmission, stands by, and is then able to attempt a frame transmission. Since several STAs are expected to attempt frame transmission after standbys for different times owing to the application of the random backoff period, it is able to minimize collision.

IEEE 802.11 MAC protocol provides HCF (hybrid coordination function). The HCF is based on the DCF and PCF (point coordination function). The PCF corresponds to a polling-based synchronous access scheme and means a scheme of performing polling periodically in order for all receiving APs and/or STAs to receive data frame. The HCF has EDCA (enhanced distributed channel access) and HCCA (HCF controlled channel access). The EDCA uses a contention based access scheme for a provider to provide a data frame to multiple users. And, the HCCA uses a non-contention based channel access scheme using a polling mechanism. The HCF includes a medium access mechanism for improving QoS (quality of service) of WLAN and is able to transmit QoS data in both a contention period (CP) and a contention free period (CFP).

Figure 17:
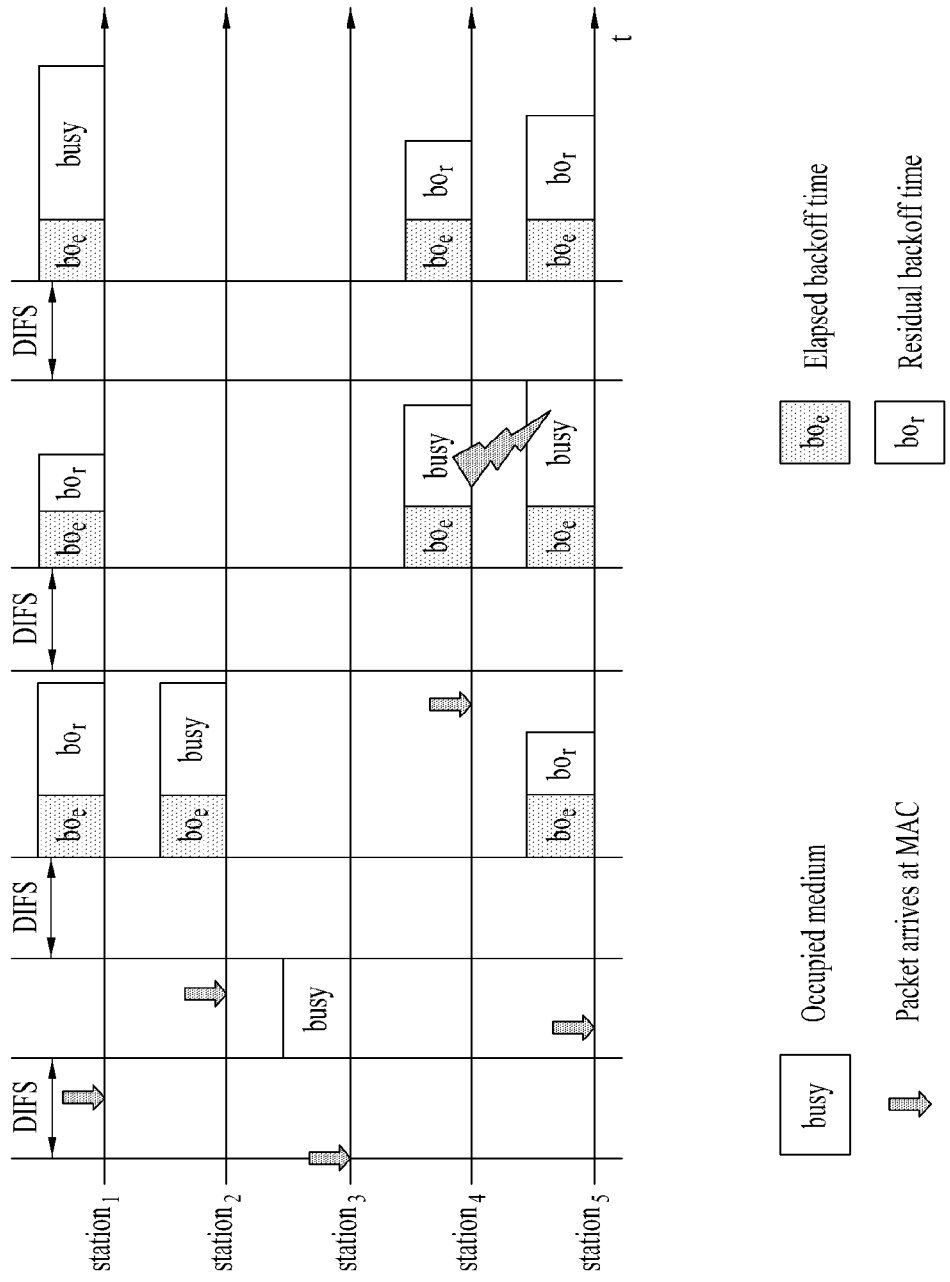
FIG. 17 is a diagram to describe a back-off process in a WLAN system to which the present invention is applicable.

FIG. 17 is a diagram to describe a backoff process in a WLAN system to which the present invention is applicable.

An operation based on a random backoff period is described with reference to FIG. 17 as follows.

First of all, if a medium in occupied or busy status enters an idle status, several STAs can attempt data (or frame) transmission. In doing so, according to a scheme of minimizing collision, each of the STAs selects a random backoff count, stands by in a slot time amounting to the selected random backoff count, and is then able to attempt the transmission. The random backoff count has a pseudo-random integer value and can be determined as 0 or one of values in a CW range. In this case, the CW is a contention window parameter value. CWmin is given as an initial value to the CW parameter. Yet, if the transmission fails [e.g., ACK for a transmitted frame is not received], the CW parameter can take a doubled value. If the CW parameter value becomes CWmax, the data transmission can be attempted by maintaining the CWmax value until the data transmission becomes successful. If the data transmission is successfully completed, the CW parameter value is rest to the CWmin value. Preferably, a value of each of the CW, CWmin and CWmax is set to (2n−1), where n=0, 1, 2 . . . .

If a random backoff process starts, the STA keeps monitoring a medium while a backoff slot is counted down according to the determined backoff count value. If the STA monitors that the medium is in a busy status, the STA waits by stopping the countdown. If the medium enters the idle status, the STA resumes the remaining countdown.

In the example shown in FIG. 17, in case that a packet to be transmitted arrives at the MAC of STA3, the STA3 confirms that the medium is in idle status and is then able to directly transmit a frame. Meanwhile, the rest of the STAs monitor that the medium is in busy status and stands by. In doing so, since data to be transmitted may be generated from each of STA1, STA2 and STA5, each of the STAs stands by for DIFS if monitoring that the medium is in idle status and is then able to count down a backoff slot according to a random backoff count value selected by itself. In the example shown in FIG. 17, the STA2 selects a smallest backoff count value and the STA1 selects a biggest backoff count value. In particular, FIG. 17 shows one example that a residual backoff time of the STA5 is shorter than that of the STA1 at the timing point at which the STA2 finishes the backoff count and starts a frame transmission. Each of the STA1 and the STA5 stops the countdown temporarily and stands by, while the STA2 occupies the medium. As the occupation by the STA2 is ended, if the medium enters the idle status again, each of the STA1 and the STA5 stands by for DIFS and then resumes the paused backoff count. In particular, the frame transmission can be started after the rest of backoff slots amounting to the residual backoff time have been counted down. Since the residual backoff time of the sTA5 is shorter than that of the STA1, the STA5 starts the frame transmission. Meanwhile, while the STA2 occupies the medium, data can be generated from the STA4. In doing so, from the viewpoint of the STA4, if the idle enters an idle status, the STA4 stands by for DIFS, performs a countdown according to a random backoff count value selected by itself, and is then able to start a frame transmission. FIG. 17 shows one example of a case that a residual backoff time of the STA5 accidently coincides with a random backoff count value of the STA4. In this case, collision may occur between the STA4 and the STA5. In case that the collision occurs, each of the STA4 and the STA5 is unable to receive ACK and fails in the data transmission. In this case, each of the sTA4 and the STA5 doubles a CW value, selects a random backoff count value, and is then able to perform a countdown. Meanwhile, the STA1 stands by while the medium is in the occupied (or busy) status due to the transmissions by the STA4 and the STA5. If the medium enters an idle status, the STA1 stands by for DIFS. If the residual backoff time elapses, the STA1 is able to start the frame transmission.

Sensing Operation of STA

As mentioned in the foregoing description, the CSMA/CA mechanism includes a virtual carrier sensing as well as a physical carrier sensing for an AP and/or STA to directly sense a medium. The virtual carrier sensing is provided to complement such a problem, which may be generated from a medium access, as a hidden node problem and the like. For the virtual carrier sensing, MAC of WLAN system is able to use a network allocation vector (NAV). The NAV is a value for an AP and/or STA currently using a medium or having an authority to use to indicate a time, which is left until a medium enters an available status, to another AP and/or STA. Hence, the value set as the NAV corresponds to a period scheduled for an AP and/or STA transmitting a corresponding frame to use a medium. If an STA receives the NAV value, the STA is prohibited from a medium access during the corresponding period. For instance, the NAV can be set according to a value of a duration field of a MAC header of a frame.

In order to reduce possibility of collision, a robust collision detecting mechanism has been introduced. This shall be described with reference to FIG. 18 and FIG. 19. Although a carrier sensing range and a carrier transmission range may not be actually identical to each other, assume that the two ranges are identical to each other for clarity of the following description.

Figure 18:
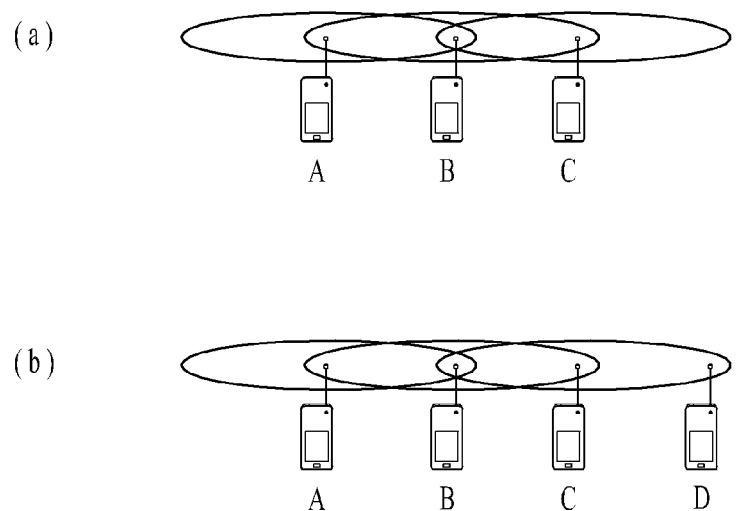
FIG. 18 is a diagram to describe a hidden node and an exposed node.

FIG. 18 is a diagram to describe a hidden node and an exposed node.

FIG. 18(a) shows one example of a hidden node, which corresponds to a case that STA C has an information to transmit in the course of a communication between STA A and STA B. In particular, despite a situation that the STA is transmitting an information to the STA B, the STA C can determine that a medium is in idle status when the STA C performs a carrier sensing before sending data to the STA B. The reason for this is that a transmission (i.e., a medium occupation) by the STA A may not be sensed at a location of the STA C. In this case, since the STA B receives both information of the STA A and information of the STA C simultaneously, a collision occurs. In doing so, the STA A can be called a hidden node of the STA C.

FIG. 18(b) shows one example of an exposed node, which corresponds to a case that STA C has an information to transmit to STA D in a situation that STA B is transmitting data to STA A. In doing so, if the STA C performs a carrier sensing, it is able to determine that a medium is occupied due to the transmission by the STA B. Hence, although the STA C has the information to transmit to the STA D, since the medium occupied status is sensed, the STA C should stand by until the medium enters an idle status. Yet, since the STA A is actually located out of a transmission range of the STA C, the transmission from the STA C and the transmission from the STA B may not collide with each other from the viewpoint of the STA A, the STA C may stand by unnecessarily until the STA B stops the transmission. In doing so, the STA C can be called an exposed node of the STAB.

FIG. 19 is a diagram to describe RTS and CTS.

First of all, in order to efficiently use a collision avoidance mechanism in the exemplary situation shown in FIG. 18, it is able to use such a short signaling packet as RTS (request to send), CTS (clear to send) and the like. In order to enable neighbor STA(s) to overhear, RTS/CTS between two STAs can be set to enable the neighbor STA(s) to consider whether to perform an information transmission between the two STAs. For instance, if a data transmitting STA transmits an RTS frame to a data receiving STA, the data receiving STA is able to announce that it will receive data by transmitting a CTS frame to neighbor user equipments.

FIG. 19(a) shows one example of a method of solving a hidden node problem, which assumes a case that both STA A and STA C intend to transmit data to STA B. if the STA A sends RTS to the STA B, the STA B transmits CTS to both of the STA A and the STA C neighboring to the STA B. As a result, the STA C stands by until the data transmission between the STA A and the STA B ends, whereby collision can be avoided.

FIG. 19(b) shows one example of a method of solving an exposed node problem. As STA C overhears RTS/CTS transmission between STA A and STA B, the STA C can determine that collision will not occur despite that the STA C transmits data to another STA (e.g., STA D). In particular, the STA B transmits RTS to all neighbor user equipments and the STA A having data to send actually transmits CTS only. Since the STA C receives the RTS but fails in receiving the CTS of the STA A, the STA C can recognize that the STA A is out of a carrier sensing of the STA C.

Power Management

As mentioned in the foregoing description, in WLAN system, STA should perform a channel sensing before performing transmission/reception. Yet, sensing a channel all the time requires a consistent power consumption of the STA. there is no big difference between a power consumption in reception status and a power consumption in transmission status. And, keeping the reception status puts a burden on a power-limited STA (i.e., a battery-operable STA). Hence, if an STA maintains a reception standby status in order to consistently sense a channel, it consumes a power inefficiently without special advantages in aspect of WLAN throughput. In order to solve this problem, a WLAN system supports a power management (PM) mode of STA.

The power management mode of STA can be divided into an active mode and a power save mode. The STA basically operates in active mode. The STA operating in active mode maintains an awake state. The awake state means a state in which a normal operation such as a frame transceiving, a channel scanning and the like is possible. On the other hand, the STA operating in PS mode operates in a manner of switching between a sleep state and an awake state. The STA operating in sleep state operates with a minimum power but does not perform a channel scanning as well as a frame transceiving.

Since a power consumption decreases if an STA operates in sleep state as long as possible, an operating period of the STA increases. Yet, since a frame transceiving is impossible in the sleep state, the STA is unable to operate long unconditionally. If there is a frame an STA operating in sleep state will transmit to an AP, the STA can transmit a frame by switching to an awake state. On the contrary, if there is no frame the AP will transmit to the STA, the STA in the sleep state is unable to receive the frame and is also unable to recognize a presence of the frame to receive. Hence, the STA may need an operation of switching to an awake state in accordance with specific periodicity in order to recognize a presence or non-presence of a frame to be transmitted to the corresponding STA (or, in order to receive the frame if the frame is present).

Figure 20:
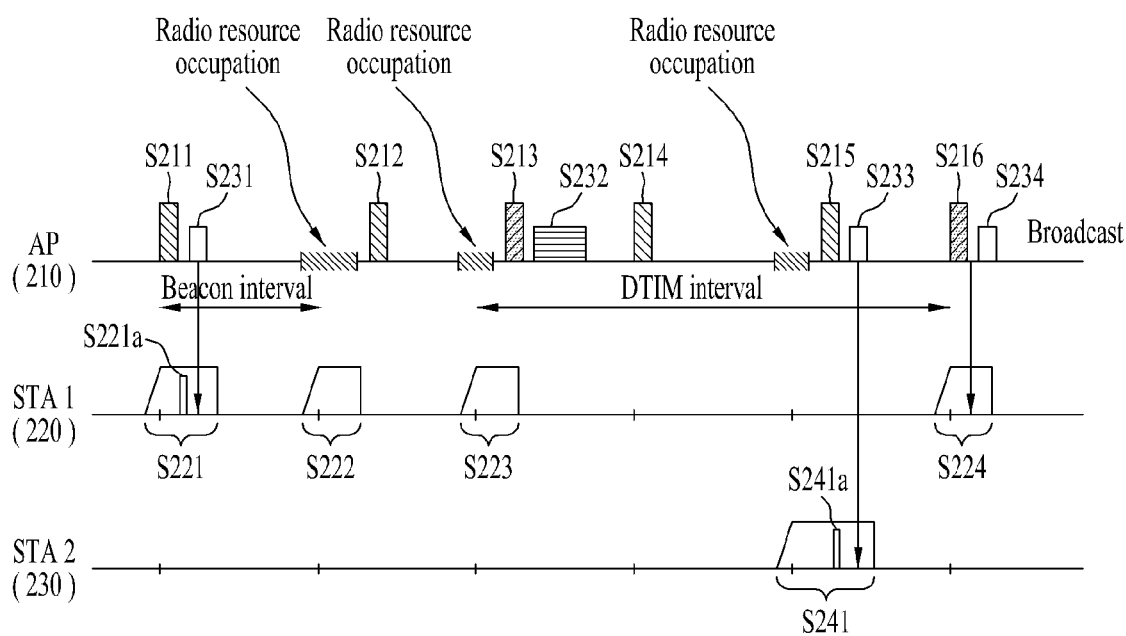
FIG. 20 is a diagram to describe a power management operation.

FIG. 20 is a diagram to describe a power management operation.

Referring to FIG. 20, an AP 210 transmits beacon frames to STAs in a BSS by predetermined periods [S211, S212, S213, S214, S215, S216]. In the beacon frame, a TIM (traffic indication map) information element is contained. The TIM information element contains an information for the AP 210 to indicate that there is a buffered traffic for STAs associated with the AP 210 and that the AP 210 will transmit a frame. TIM element may include a TIM used to indicate a unicast frame and a DTIM (delivery traffic indication map) used to indicate a multicast or broadcast frame.

The AP 210 can transmit the DTIM once per 3 transmissions of the beacon frames.

STA1 220 and STA2 are STAs operating in PS mode. Each of the STA1 220 and the STA2 230 can be set to receive the TIM element transmitted by the AP 210 by switching to an awake state from a sleep state in every wakeup interval of prescribed periodicity. Each of the STAs can calculate a timing point of switching to an awake state based on its local clock. In the example shown in FIG. 20, assume that the clock of the STA coincides with a clock of the AP.

For instance, the prescribed wakeup interval can be set for the STA1 220 to receive the TIM element by switching to the awake state in every beacon interval. Hence, when the AP 210 transmits the beacon frame for the $1^{st}$ time [S211], the STA1 220 can switch to the awake state [S221]. The STA1 220 receives the beacon frame and is able to acquire the TIM element. If the acquired TIM element indicates that there is a frame to be transmitted to the STA1 220, the STA1 220 can transmit a PS-Poll (Power Save-Poll) frame, which is provided to make a request for a frame transmission to the AP 210, to the AP 210 [S221a]. The AP 210 is able to transmit a frame to the STA1 220 in response to the PS-Poll frame [S231]. Having received the frame, the STA1 220 operates by switching to the sleep state again.

When the AP 210 transmits the beacon frame for the $2^{nd}$ time, since a medium is occupied (i.e., the medium is a busy medium) in a manner that another device accesses the medium for example, the AP 210 is unable to transmit the beacon frame to correspond to an accurate beacon interval but is able to transmit the beacon frame at a delayed timing point [S212]. In this case, although the STA1 220 switches its operating mode to the awake state to correspond to the beacon interval, since the STA1 220 fails in receiving the beacon frame transmitted by being delayed, the STA1 220 switches to the sleep state again [S222].

When the AP 210 transmits the beacon frame for the $3^{rd}$ time, TIM element set as DTIM may be contained in the corresponding beacon frame. Yet, since the medium is occupied (i.e., the medium is a busy medium), the AP 210 transmits a delayed beacon frame [S213]. The STA1 220 operates by switching to the awake state to correspond to the beacon interval and is able to acquire DTIM through the beacon frame transmitted by the AP 210. The DTIM acquired by the STA1 220 is assumed as indicating that there is no frame to be transmitted to the STA1 220 and that a frame for another STA is present. In this case, the STA1 220 confirms that there is no frame to receive and is then able to operate by switching to the sleep state again. After transmitting the beacon frame, the AP 210 transmits a frame to the corresponding STA [S232].

The AP 210 transmits the beacon frame for the $4^{th}$ time [S214]. Yet, since the STA1 220 is unable to acquire information, which indicates that a buffered traffic for the STA1 220 is present, through the 2 previous TIM element receptions, the STA1 220 is able to adjust a wakeup interval for the TIM element reception. On the other hand, if a signaling information for adjusting a wakeup interval value of the STA1 220 is contained in the beacon frame transmitted by the AP 210, the wakeup interval value of the STA1 can be adjusted. According to the present example, the STA1 220 can be set to switch an operating state in a manner that the STA1 220 wakes up once in every 3 beacon intervals instead of switching the operating state for the TIM element reception in every beacon interval. Hence, since the STA1 220 maintains the sleep state at the timing point at which the AP 210 transmits the beacon frame for the $5^{th}$ time [S215] after transmitting the $4^{th}$ beacon frame [S214], the STA1 220 is unable to acquire the corresponding TIM element.

When the AP 210 transmits the beacon frame for the $6^{th}$ time [S216], the STA1 220 operates by switching to the awake state and is able to acquire the TIM element contained in the beacon frame [S224]. Since the TIM element is the DTIM that indicates that a broadcast frame is present, the STA1 220 does not transmit a PS-Poll frame to the AP 210 but is able to receive a broadcast frame transmitted by the AP 210 [S234]. Meanwhile, a wakeup interval set for the STA2 230 can be set to have a period longer than that of the STA1 220. Hence, the STA2 230 can receive the TIM element by switching to the awake state at the timing point S215 at which the AP 210 transmits the beacon frame for the $5^{th}$ time [S241]. The STA2 230 recognizes that a frame to be transmitted to the STA2 230 is present from the TIM element and is then able to transmit a PS-Poll frame to the AP 210 to request a frame transmission [S241a]. Finally, the AP 210 is able to transmit a frame to the STA2 230 in response to the PS-Poll frame [S233].

For the power save mode management shown in FIG. 20, TIM element contains TIM indicating whether a frame to be transmitted to STA is present or DTIM indicating whether a broadcast/multicast frame is present. And, the DTIM can be implemented through a field setup of the TIM element.

Figure 21:
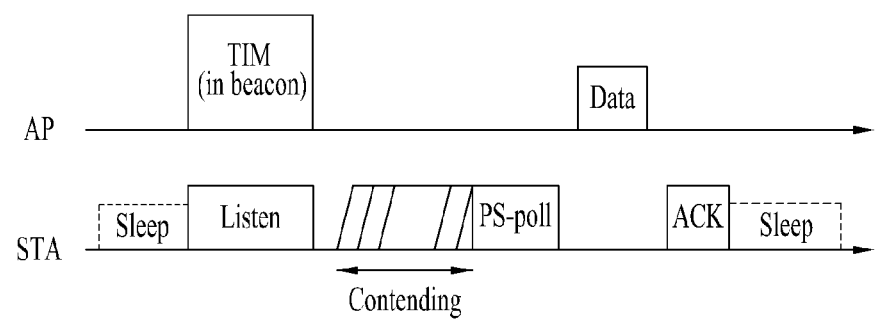
FIGS. 21 to 23 are diagrams to describe operations of an STA having received TIM in detail.
Figure 22:
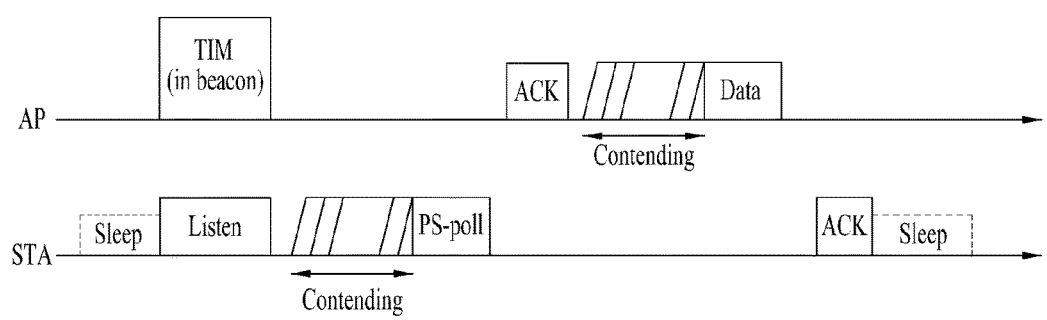
Figure 23:
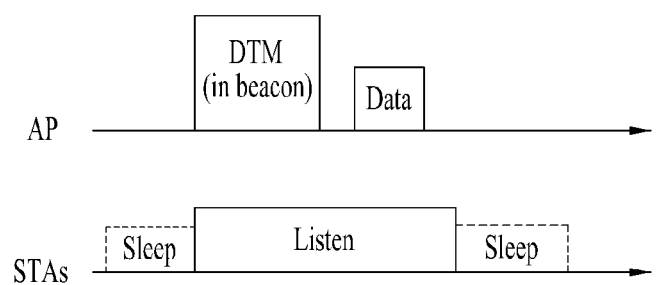

FIGS. 21 to 23 are diagrams to describe operations of an STA having received TIM in detail.

Referring to FIG. 21, an STA switches to an awake state from a sleep state in order to receive a beacon frame containing a TIM from an AP and is then able to recognize that there is a buffered traffic to be transmitted to the STA by interpreting the received TIM element. The STA performs contention with other STAs for a medium access for a PS-Poll frame transmission and is then able to transmit a PS-Poll frame to make a request for a data frame transmission to the AP. Having received the PS-Poll frame transmitted by the STA, the AP is able to transmit a frame to the STA. The STA receives a data frame and is then able to transmit an ACK frame to the AP in response to the received data frame. Thereafter, the STA can switch to the sleep state again.

Like the example shown in FIG. 21, an AP can operate by an immediate response scheme in a manner of receiving a PS-Poll frame from an STA and then transmitting a data frame after a lapse of a prescribed time (e.g., SIFS (short inter-frame space). Meanwhile, after the AP has received the PS-Poll frame, if the AP fails to prepare the data frame, which is to be transmitted to the STA, within the SIFS time, the AP is able to operate by a deferred response scheme. This is described with reference to FIG. 22 as follows.

In an example shown in FIG. 22, like the former example shown in FIG. 21, an STA operates in a manner of switching to an awake state from a sleep state, receiving a TIM from an AP, and then transmitting a PS-Poll frame to the AP. If the AP fails to prepare a data frame during SIFS despite receiving the PS-Poll frame, the AP is able to transmit an ACK frame to the STA instead of transmitting the data frame. If the AP prepares the data frame after transmitting the ACK frame, the AP performs a contending and is then able to transmit the data frame to the STA. Subsequently, the STA transmits an ACK frame, which indicates that the data frame is successfully received, to the AP and is then able to switch to the sleep sate.

FIG. 23 shows one example that an AP transmits a DTIM. Each of STAs can switch to an awake state from a sleep state in order to receive a beacon frame containing a DTIM element from an AP. Each of the STAs can be aware that a multicast/broadcast frame will be transmitted through the received DTIM. After the AP has transmitted the beacon frame containing the DTIM, the AP is able to immediately transmit data (i.e., multicast/broadcast frame) without a PS-Poll frame transceiving operation. Each of the STAs receives the data in the course of keeping the awake state after receiving the beacon frame containing the DTIM and is then able to switch to the sleep state again after completion of the data reception.

TIM Structure

In a power save mode managing method based on TIM (or DTIM) protocol described with reference to one of FIGS. 21 to 23, each of STAs can check whether a data frame, which will be transmitted for the corresponding STA, is present through STA identification information contained in TIM element. The STA identification information may include an information related to an AID (association identifier) assigned to the STA in the course of association with an AP.

The AID is used as a unique identifier for each STA in a single BSS. For instance, in a current WLAN system, the AID can be assigned as one of values ranging 1 to 2,007. In a currently defined WLAN system, 14 bits can be assigned to AID in a frame transmitted by an AP and/or STA and an AID value can be set to a value up to 16,383. Yet, 2,008 to 16,383 are set as reserved values.

TIM element according to an existing definition is not appropriate for applying an M2M application for associating a number of STAs (e.g., over 2,007 STAs) with a single AP. In case of extending an existing TIM structure as it is, since a TIM bitmap size increases to large, it cannot be supported by an existing frame format and is not appropriate for an M2M communication that considers an application of a low transmission rate. And, in the M2M communication, it is estimated that the number of STAs having a received data frame present in a single beacon period will be very small. Hence, considering the application example of the M2M communication, although a size of a TIM bitmap increases, since it is estimated that most of bits will have zero values frequently, a technology of compressing a bitmap efficiently is required.

As an existing bitmap compression technology, a method of defining an offset (or start point) value by omitting contiguous zeroes in a head part of a bitmap is prepared. Yet, although the number of STAs having buffered frames is small, if an AID value difference of each STA is big, compression efficiency is not high. For instance, in case that a frame, which is to be transmitted to two STAs respectively having AIDs set to 10 and 2,000, is buffered only, although a compressed bitmap has a length of 1,990, it has all zero values except both ends. In case that the number of STAs associable with a single AP is small, inefficiency of bitmap compression is not a big problem. Yet, if the number of STAs increases, such inefficiency may become a factor of degrading overall system performance.

In order to solve such a problem, data transmission can be performed effectively in a manner of dividing AID into several groups. In this case, a designated group ID (GID) is assigned to each of the groups. The AID assigned on the basis of group is described with reference to FIG. 24 as follows.

Figure 24:
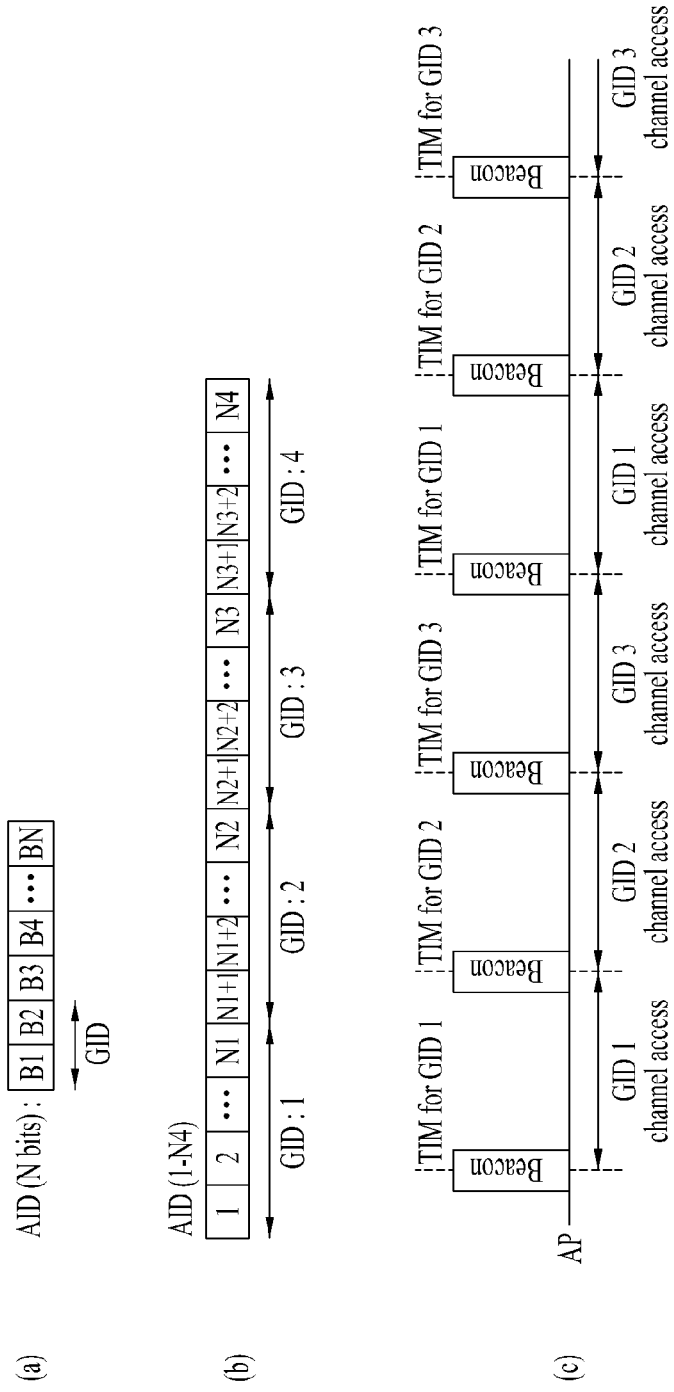
FIG. 24 is a diagram to describe a group based AID.

FIG. 24 is a diagram to describe a group based AID.

FIG. 24(a) shows one example of AID assigned on the basis of group. In the example shown in FIG. 24(a), several bits in a head part of AID bitmap can be used to indicate GID. For instance, it is able to indicate 4 GIDs using first 2 bits of the AID bitmap. If a total length of the AID bitmap is N bits, first 2 bits B1 and B2 indicate a GID of a corresponding AID.

FIG. 24(b) shows another example of AID assigned on the basis of group. In the example shown in FIG. 24(b), a GID can be assigned in accordance with a location of an AID. In this case, AIDs using the same GID can be represented as offset and length values. For instance, if GID 1 is represented as offset A and length B, it means that AIDs of A to (A+B−1) have GID 1 on a bitmap. For instance, in the example shown in FIG. 24(b), assume that all AIDs 1 to N4 are divided into 4 groups. In this case, AIDs belonging to GID 1 are 1 to N1. And, the AIDs belonging to this group can be represented as offset 1 and length N1. AIDs belonging to GID 2 can be represented as offset (N1+1) and length (N2−N1+1). AIDs belonging to GID 3 can be represented as offset (N2+1) and length (N3−N2+1). AIDs belonging to GID 4 can be represented as offset (N3+1) and length (N4−N3+1).

If such a group-basis assigned AID is employed, a channel access is allowed in a time interval differing according to GID. Therefore, a shortage problem of TIM elements for a number of STAs can be solved and data can be efficiently transceived. For instance, a channel access is allowed for STA(s) corresponding to a specific group in a specific time interval, while the rest of STA(s) may be restricted from the channel access. Thus, a prescribed time interval for allowing an access for specific STA(s) only may be named a restricted access window (RAW).

A channel access according to GID is described with reference to FIG. 24(c) as follows. FIG. 24(c) shows one example of a channel access mechanism according to a beacon interval in case that AID is divided into 3 groups. A $1^{st}$ beacon interval (or a $1^{st}$ RAW) is an interval that allows a channel access for an STA corresponding to an AID belonging to GID 1 but does not allow a channel access for STAs belonging to other GIDs. In order to implement this, TIM element for AIDs corresponding to the GID1 only is contained in a $1^{st}$ beacon. TIM element for AIDs having GID 2 only is contained in a $2^{nd}$ beacon frame. Hence, a channel access of an STA corresponding to the AID belonging to the GID 2 is allowed in a $2^{nd}$ beacon interval (or a $2^{nd}$ RAW) only. TIM element for AIDs having GID 3 only is contained in a $3^{rd}$ beacon frame. Hence, a channel access of an STA corresponding to the AID belonging to the GID 3 is allowed in a $3^{rd}$ beacon interval (or a $3^{rd}$ RAW) only. The TIM element for AIDs having GID 1 only is contained in a $4^{th}$ beacon frame again. Hence, a channel access of an STA corresponding to the AID belonging to the GID 1 is allowed in a $4^{th}$ beacon interval (or a $4^{th}$ RAW) only. Subsequently, in each of the following beacon intervals including a $5^{th}$ beacon interval (or a $5^{th}$ RAW), a channel access may be allowed only for STA belonging to a specific group indicated by a TIM contained in a corresponding beacon frame.

FIG. 24(c) shows one example that an order of GID allowed according to a beacon interval is cyclic or periodic, by which the GID order is non-limited. In particular, an operation can be performed in a following manner. First of all, in a manner that that AID(s) belonging to specific GID(s) is contained in a TIM element (hereinafter named 'a separate TIM operation), a channel access is allowed only for STA(s) corresponding to the specific AID(s) in a specific time interval (e.g., a specific RAW) while the channel access is not allowed for the rest of STA(s). So to speak, an information indicating whether an AP instructs data buffering to STAs of an access group by a specific TIM may be limited to the access group by the corresponding TIM.

The group based AID assignment system mentioned in the above description may be named a hierarchical structure of TIM. In particular, a whole AID space is divided into a plurality of blocks and a channel access may be allowed only for STA(s) (i.e., STA of a specific group) corresponding to a specific block having a non-zero value. Hence, an STA can easily maintain TIM information by dividing a TIM in large size into small blocks/groups and the management of the blocks/groups in accordance with a class, QoS (quality of service) or usage of STA is facilitated. In the example shown in FIG. 24, 2-level layer is illustrated. Yet, it is able to configure a TIM of a hierarchical structure having at least two or more levels. For instance, a whole AID space is divided into a plurality of page groups, each of the page groups is divided into a plurality of blocks, and each of the locks can be divided into a plurality of subblocks. In this case, as an extension of the example shown in FIG. 24(a), an AID bitmap can be configured in a following manner. First of all, first N1 bits indicate a page ID (i.e., PID), next N2 bits indicate a block ID, next N3 bits indicate a subblock ID, and the rest of bits indicate an STA bit location in a subblock.

Meanwhile, an STA is able to acquire information on TIM element (e.g., TIM for GID 1, TIM for GID 2, TIM for GID 3, etc.) discriminated per group mentioned in the above description from a normal beacon (e.g., a DTIM beacon, a long beacon, etc.) transmitted by long period [not shown in FIG. 24]. For instance, While an STA is performing a process for association with an AP, the STA acquires information (e.g., transmission period/length of the TIM element discriminated per group, a slot time in each group access interval, etc.) on TIM element discriminated per group from a beacon transmitted by long period and is then able to receive a corresponding TIM element by switching to an awake state in a period in which the corresponding TIM element of the group having the corresponding STA belong thereto is transmitted. Such a TIM element discriminated per group can be named a TIM segment.

To examples of the present invention mentioned in the following description, various methods of dividing STAs (or AIDs respectively assigned to STAs) by prescribed hierarchical group unit and managing the STAs are applicable, by which the group based AID assignment method may be non-limited.

AID Change

AID assigned to an STA may be changed in a manner of being reassigned due to several reasons. AID may be changed in the same group or may be changed into another AID belonging to another group. For instance, when TIM compression is performed to reduce a length of a TIM element, if values of AIDs assigned to STAs are located close to each other, it is able to perform the TIM compression more efficiently. Hence, it may be necessary for an STA to reassign AID into another AID within the same group. In this case, an AP may be able to perform an efficient TIM compression by changing the AID of the STA into another AID within the same group.

For another instance, as a group to which an AID assigned to an STA belongs is saturated, if the STA has difficulty with a channel access, the STA may need to make a request for changing a group to which the corresponding STA will belong. In doing so, the STA may make a request for a change into an AID of another group to an AP, or the AP may reassign an AID of another group to the STA.

Figure 25:
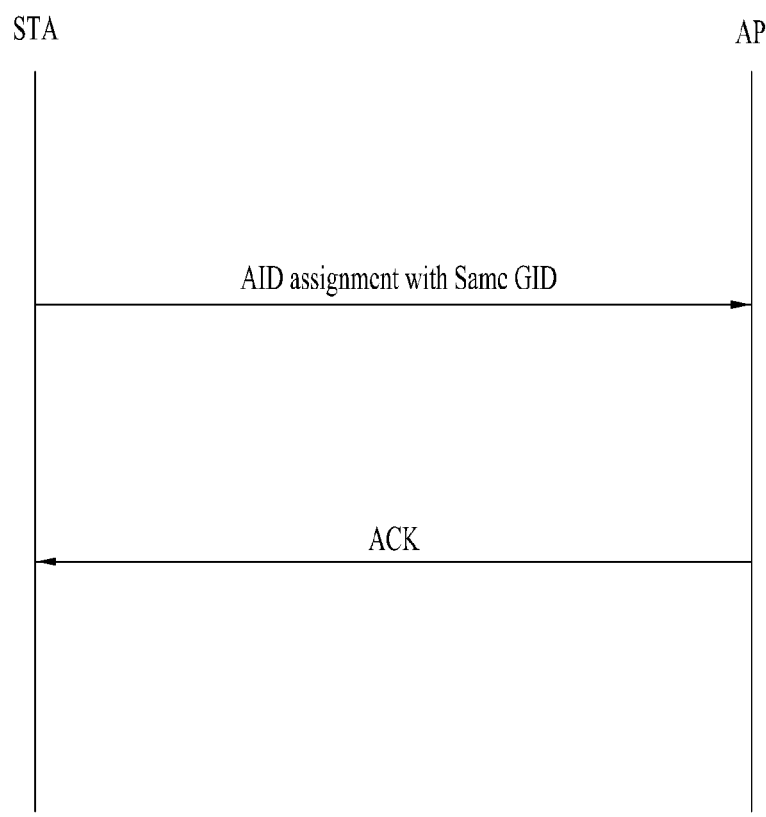
FIG. 25 is a diagram for one example of a process for changing AID of STA in the same group centering on signaling.

FIG. 25 is a diagram for one example of a process for changing AID of STA in the same group centering on signaling. An AP is able to reassign an AID to an STA by transmitting a frame of AID assignment with a same GID to the STA. The frame of the AID assignment with the same GID is shown in FIG. 26.

Figure 26:
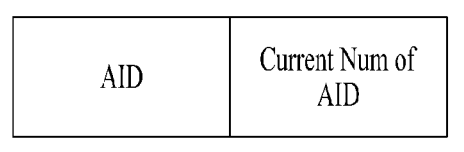

Referring to FIG. 26, an AID field indicates an AID which will be newly assigned to an STA. And, a current AID number field (Current Num of AID) indicates the number of assigned AIDs included in a group to which an AID to be reassigned belongs (or, the number of STAs).

An AP is able to inform the STA of a new AID by transmitting a frame of AID assignment with the same GID to the STA. Having received the corresponding frame, the STA is able to announce that the new AID has been successfully assigned by transmitting an ACK frame to the AP.

Figure 27:
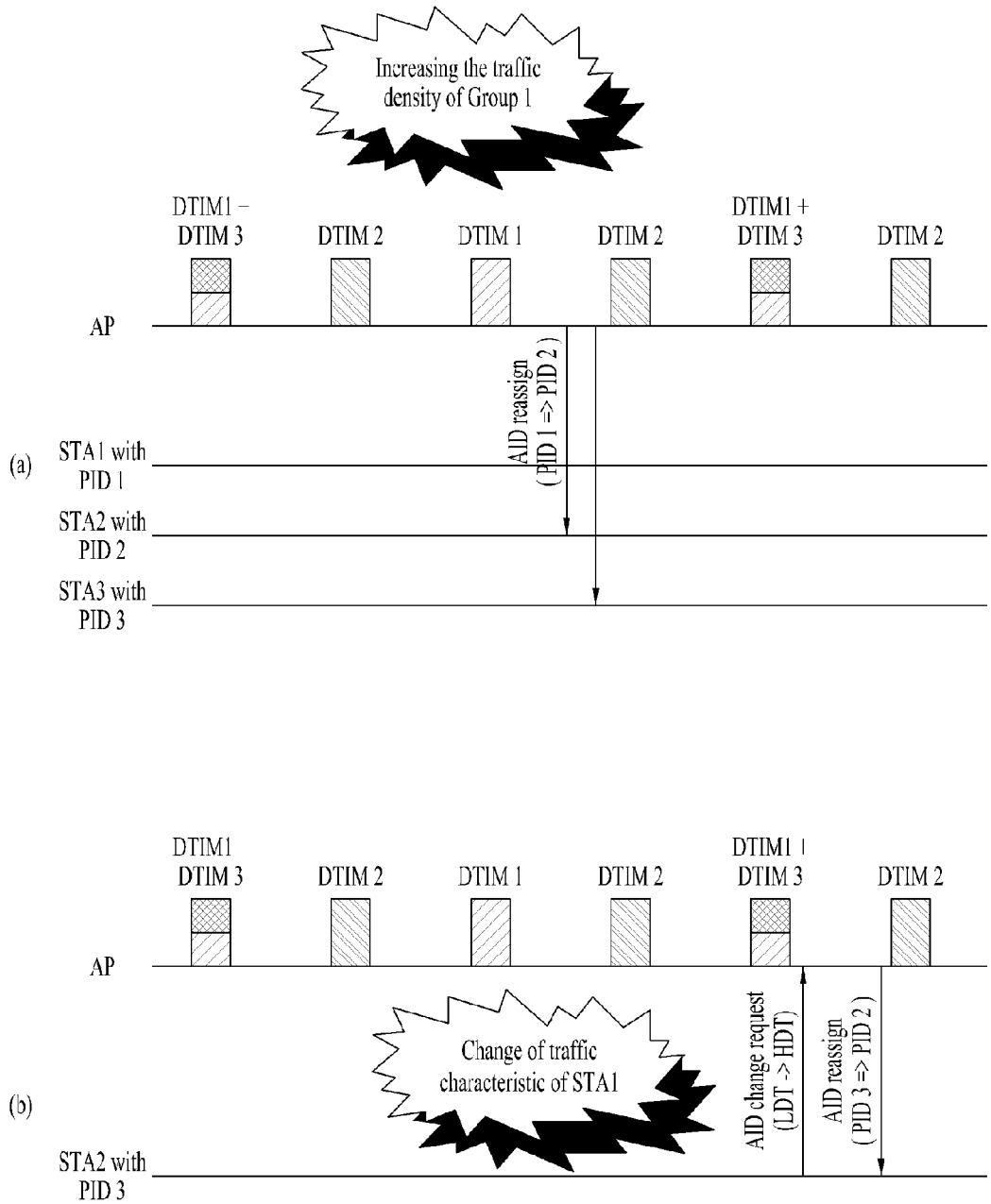
FIG. 27 is a diagram for one example of a process for changing AID of STA belonging to a specific group into AID of another group centering on signaling.

FIG. 27 is a diagram for one example of a process for changing AID of STA belonging to a specific group into AID of a different group centering on signaling. An STA intending to reassign an AID belonging to a different group is able to make a request for AID reassignment with an AID belonging to a different GID by transmitting an AID assignment request frame to an AP. The AP can assign the AID belonging to the different GID to the STA by transmitting a frame of AID assignment of a different GID (AID Assignment with Different GID frame) to the STA. In this case, the AP may transmit the frame of the AID assignment with the different GID (AID Assignment with Different GID frame) in response to the AID assignment request frame from the STA, or may be able to transmit the frame of the AID assignment with the different GID subjectively.

FIG. 27(a) is a diagram for one example to describe that an AP subjectively changes an AID of an STA. FIG. 27(b) is a diagram for one example to describe that an AID of an STA is changed in response to a request made by the STA.

Assuming that STAs belonging to a specific group can use a channel only in a channel access interval for an assigned group, it may happen that the traffic for the STAs is concentrated in a channel access interval for a specific group. In this case, an AP is able to change a group of user equipments belonging to a traffic concentrated group into a different group for load distribution. In FIG. 27(a), assume that STAs in a BSS are grouped into Group 1, Group 2 and Group 3 and that STA 1, STA 2 and STA 3 currently belong to Group 1. If the traffic density of Group 1 is greater than that of a different group in a specific interval, an AP is able to move some STA(s) belonging to Group 1 to the different group. In the example shown in FIG. 27(a), in order to move STA 2 and STA 3 to Group 2 from Group 1, the AP reassigns AIDs of STA 2 and STA 3.

If traffic property (or characteristic) of an STA is changed, it is necessary to change a group of the STA to be appropriate for the changed traffic property. The traffic property changed STA can make a request for a change into a group appropriate for the changed traffic to an AP. In particular, in order to change a group, the STA is able to make a request for AID reassignment to the AP. Having received the request for the AID reassignment, the AP is able to reassign an AID of a different group to a user equipment. In the example shown in FIG. 27(b), STAs are grouped into Group 1, Group 2 and Group 3 and STA 1 belongs to the Group 3 before AID reassignment. Referring to DTIM element shown in FIG. 27(b), it can be observed that each of the Group 1 and the Group 2 has a high duty cycle and that the Group 3 has a low duty cycle. In particular, a channel access interval of each of the Group 1 and the Group 2 is repeated by short period, whereas a channel access interval of the Group 3 is repeated by long period. If the traffic property of the STA 1 belonging to the Group 3 is changed into a high duty cycle from a low duty cycle, the STA 1 can transmit an AID reassignment request frame, which contains an information (i.e., an information on a group preferred by the STA 1) on a group appropriate for the changed property (i.e., high duty cycle), to the AP. Based on the AID reassignment request frame received from the STA, the AP can reassign an AID appropriate for the group, which is desired to be changed, to the STA. In the example shown in FIG. 27(b), a group of the STA 1 is changed into the Group 2 having the high duty cycle.

AID Change in Direct Link Setup Status

An STA is able to directly communicate with a different STA without going via an AP. For instance, an STA is able to directly communicate with a different STA using such a scheme as DLS (direct link setup), TDLS, Wi-Fi Direct, and the like. In doing so, in order to reduce unnecessary overhead, the STA may undergo a process for checking whether a frame received from a counterpart STA is its own frame. For instance, if an incomplete AID (e.g., a partial AID) is contained in the SIGA shown in FIG. 15, when the STA receives a frame, the STA is able to identify whether the frame is transmitted to itself by checking the partial AID contained in the SIGA. If the partial AID does not match an AID of the STA, the STA determines that the received frame is not the frame transmitted to the corresponding STA and does not decode a payload part, whereby unnecessary processing overhead can be reduced. Yet, in case that the AID of the STA is changed, since a counterpart STA directly communicating with the AID changed STA is not aware of the changed AID of the STA, the counterpart STA may have difficulty in performing the direct communication. This is described in detail with reference to the example shown in FIG. 28 as follows.

Figure 28:
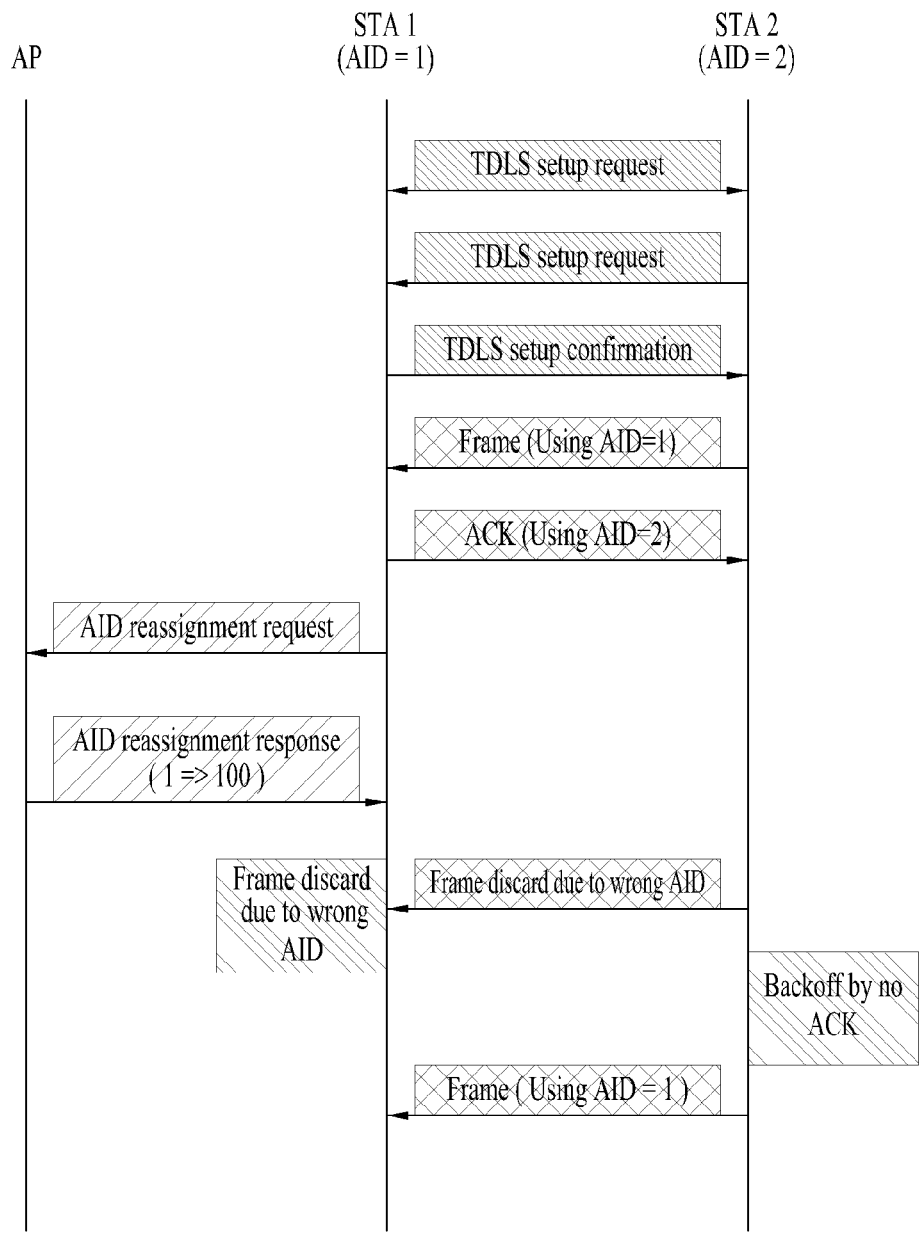
FIG. 28 is a diagram for one example to describe a problem that may be caused if AID of STA having a direct link setup with another STA is changed.

FIG. 28 is a diagram for one example to describe a problem that may be caused if AID of STA having a direct link setup with another STA is changed. For clarity of the following description, a direct communication scheme between STAs is assumed as TDLS.

Through TDLS, while a direct communication is active between STA 1 and STA 2 shown in FIG. 28, if an AP reassigns an AID of the STA 1, the STA 2 attempts a frame transmission to the STA 1 using a previous AID of the STA 1 until a changed AID of the STA 1 is updated. In this case, since the updated AID and an AID (e.g., a partial AID)

contained in the frame fail to match each other, the STA 1 determines that the frame is not a frame transmitted to the STA 1 and may omit the decoding of a payload part. Hence, in case that the AID of the STA 1 is updated, the STA 2 failing to recognize the update event has difficulty in communicating with the STA 1.

Therefore, the present invention intends to provide various methods for solving the above problem. For clarity of the following description of embodiments, an STA configured to perform a direct communication with a prescribed STA shall be named 'counterpart STA'.

Timer Based Operation

An AP is able to assign a new AID to an STA subjectively or in response to a request for an AID change from the STA. The STA is able to make a request for an AID change to the AP using such a frame for requesting a new AID as an AID reassignment request frame, an AID switch request frame and the like or such a previously defined frame as an association request frame and the like.

Subjectively or in response to the AID change request from the STA, the AP is able to assign a new AID to the STA using such a frame for assigning a new AID as an AID reassignment response frame containing a new AID information on a new AID desired to be reassigned to the STA, an AID switch response frame and the like or such a previously defined frame as an association response frame and the like.

For clarity of the description, according to the present invention, a frame for an STA to make a request for reassignment of an AID to an AP shall be named 'reassignment request frame' and a frame containing a new AID information, which is transmitted from the AP to the STA, shall be named 'reassignment response frame'.

For clarity of the description, in the accompanying drawings for the following description, a reassignment request frame shall be illustrated as an AID reassignment request frame or an AID switch request frame and a reassignment response frame shall be illustrated as an AID reassignment response frame or an AID switch response frame. Moreover, an AP shall be assumed as transmitting a reassignment response frame in response to a reassignment request frame received from an STA.

According to the present invention, an AP changes an AID of an STA and may not then assign an old AID of the corresponding STA to a different user equipment for a specific timer (or a specific period). Before the STA uses a timer, the AP can deliver a timer information (or a period information) to the STA. The timer information may be contained in a reassignment response frame transmitted to the STA by the AP.

After the AID has been reassigned to the STA, the corresponding STA can use both of the two AIDs for a specific timer (or a specific period) based on the timer information (or the period information) received from the AP. Thus, until a determined timer expires, the STA having the AID reassigned thereto performs data transceiving with a different STA having a direct link already established before the AID reassignment using the old AID previous to an update until timer expiration, thereby being able to maintain a smooth communication with the different STA having the established direct link. Until the timer expires, the AID reassigned STA may be able to perform the data transceiving with the AP using one of the reassigned AID and the old AID used before the reassignment. This is described in detail with reference to FIG. 29 as follows.

Figure 29:
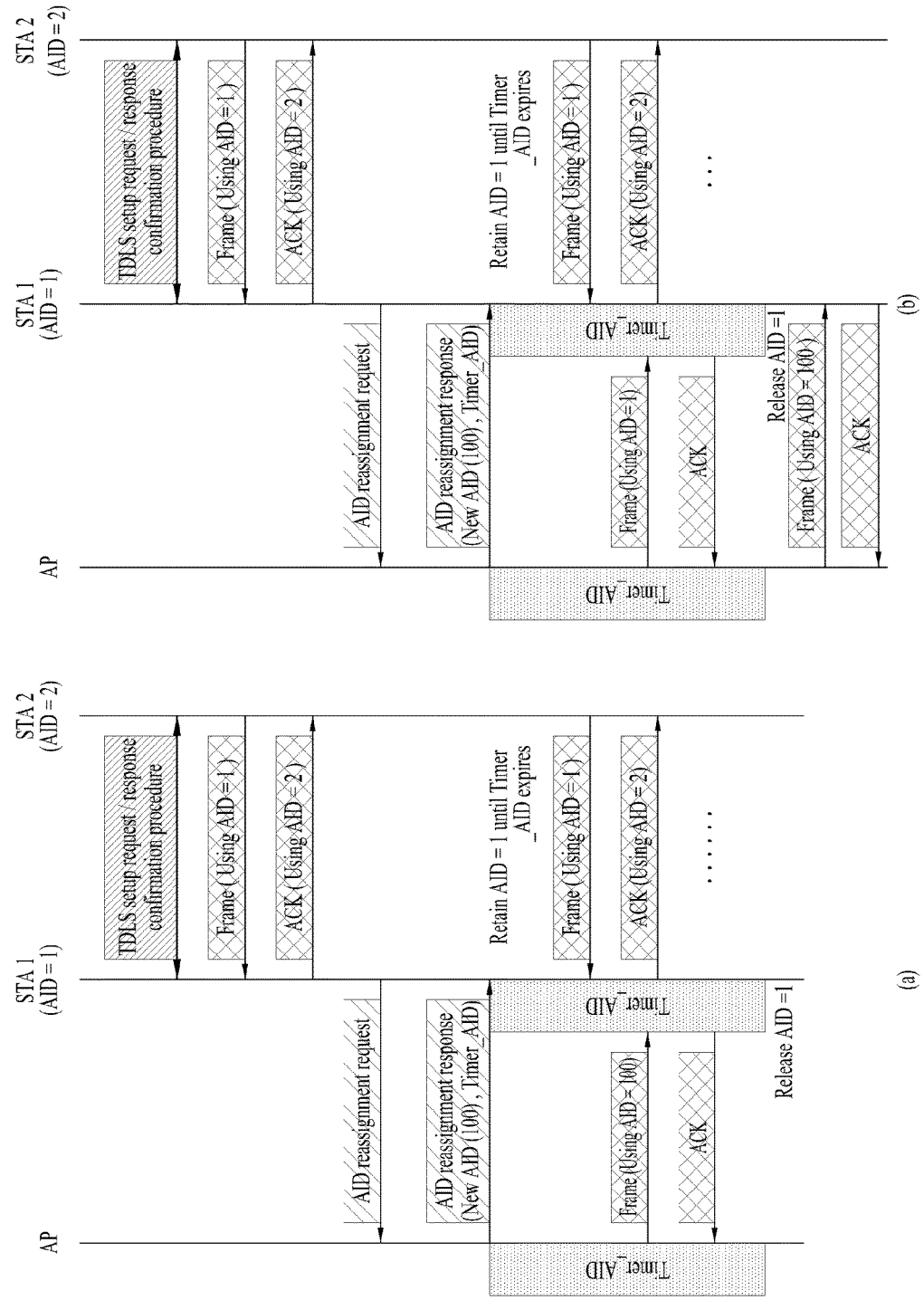
FIG. 29 is a diagram for one example to describe that an STA having AID reassigned thereto uses both two AIDs.

FIG. 29 is a diagram for one example to describe that an STA having AID reassigned thereto uses both two AIDs.

FIG. 1 shows one example that a direct link is established between STA 1 and STA 2 through TDLS before an AID is reassigned to the STA 1. Moreover, in the example, the AID reassignment is performed in a following manner. First of all, the STA 1 transmits an AID reassignment request frame to the AP. Secondly, in response to the AID reassignment request frame, the AP transmits an AID reassignment response frame containing a reassigned AID information (New AID) and a timer information (Timer_AID). Before a new AID is reassigned to the STA 1, the STA 1 and the STA 2 can perform a communication with each other using an AID (e.g., '1' shown in FIG. 29) used before the reassignment.

In case that the AID is reassigned to the STA 1, the AP and the STA 1 can start a timer. Until the timer expires, the STA 1 is able to use both of the newly assigned AID (e.g., '100' shown in FIG. 29) and the previously used AID (e.g., '1' shown in FIG. 29). Hence, the STA 1 recognizes a frame, which is transmitted by the STA 2 unaware of an AID update event in a manner of writing AID 1 in the frame, as its own frame and is then able to perform decoding on the recognized frame. The STA 1 is able to perform a data communication with the AP using one of the newly assigned AID 100 and the previously used AID 1. In the example shown in FIG. 29(*a*), the AP and the STA 1 perform a communication using the reassigned AID 100 before a timer expires. On the other hand, in the example shown in FIG. 29(*b*), the AP and the STA 1 perform a communication using the AID 1 previously used before the timer expires.

Once the timer expires, as the STA 1 returns the previously assigned AID 1, the AP can assign the AID 1 to a different STA after a timer expiration timing point. Hence, after the timer expires, the STA 1 and the AP will communicate with each other using the newly assigned AID 100.

If an STA uses two AIDs before expiration of a timer, it is just a temporary solution. For instance, after the timer has expired, since the STA uses a reassigned AID only, it may cause a problem to a communication with a counterpart STA unaware of an AID update event. In order to solve such a problem, the STA is able to inform a direct link established counterpart STA of the AID update event before the timer expires. In particular, the STA can transmit an update request frame containing a newly assigned AID information to the counterpart STA in order to inform the counterpart STA of the AID update event. In response to the update request frame, the counterpart STA can transmit an update response frame to the STA. This is described in detail with reference to FIG. 30 and FIG. 31 as follows.

Figure 30:
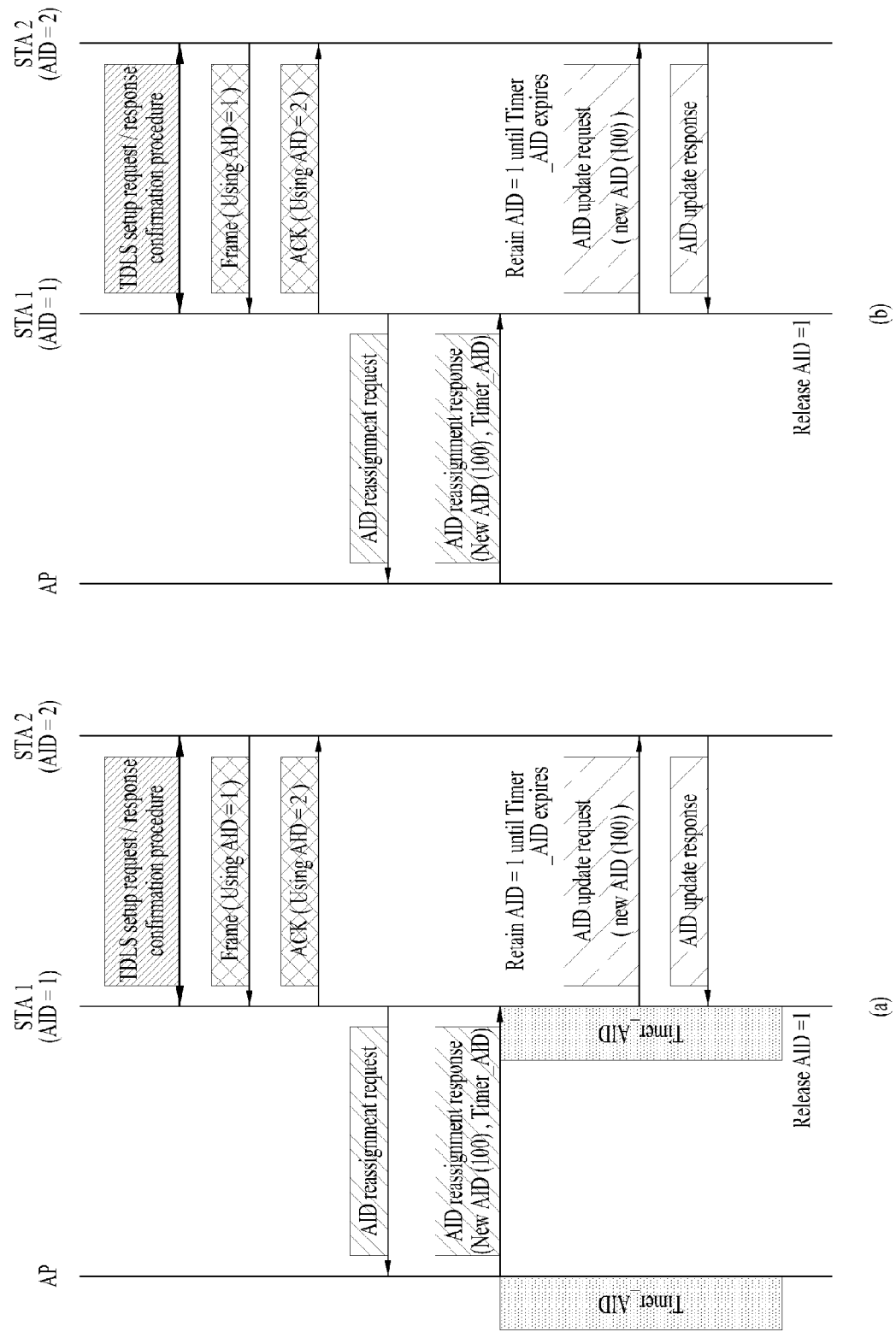
FIG. 30 is a diagram for one example to describe that an STA reports an update event of AID to a counterpart STA.

FIG. 30 is a diagram for one example to describe that an STA reports an update event of AID to a counterpart STA.

Referring to FIG. 30(*a*), STA 1 to which a new AID 100 is assigned by an AP starts a timer. The STA 1 is then able to retain a previously used AID 1 until the timer expires. Hence, STA 2 may be able to perform a communication with the STA 1 using the AID 1 previously used by the STA 1 until recognizing an AID update event of the STA 1. In order to inform the direct link established STA 2 of the AID update event, the STA 1 can transmit an AID update request frame containing a newly assigned AID information (New AID). If the direct link between the STA 1 and the STA 2 is based on TDLS, the AID update request frame may be called a TDLS AID update request frame.

Having received the AID update request frame, the STA 2 recognizes the AID change event of the STA 1 and is then able to transmit an AID update response frame in response to the AID update request frame. If the direct link between the STA 1 and the STA 2 is based on TDLS, the AID update response frame may be called a TDLS AID update response frame.

Through the AID update procedure, since the STA 2 recognizes that the AID of the STA 1 is changed into 100 from 1, the STA 2 may be able to keep communicating with the STA 1 using the new AID reassigned to the STA 1.

Although FIG. 30(*a*) shows one example that the AID update request frame and the AID update response frame are transmitted before the timer expires, it may be unnecessary for the two transmissions to be performed before the timer expiration. For instance, if the AID update is not effectively completed until the timer expiration, the AID update request frame and the AID update response frame may be performed after the timer expiration.

In the example shown in FIG. 30(*a*), the update request frame and the update response frame include an AID update request frame and an AID update response frame, respectively. Unlike the example shown in FIG. 30(*a*), the update request frame and the update response frame may include previously defined frames. For instance, the update request frame may include a TDLS setup request frame and the update response frame may include a TDLS setup response frame. In some cases, an STA can use a TDLS setup confirm frame in response to a TDLS setup response frame transmitted by a counterpart STA. This is described in detail with reference to FIG. 31 as follows.

Figure 31:
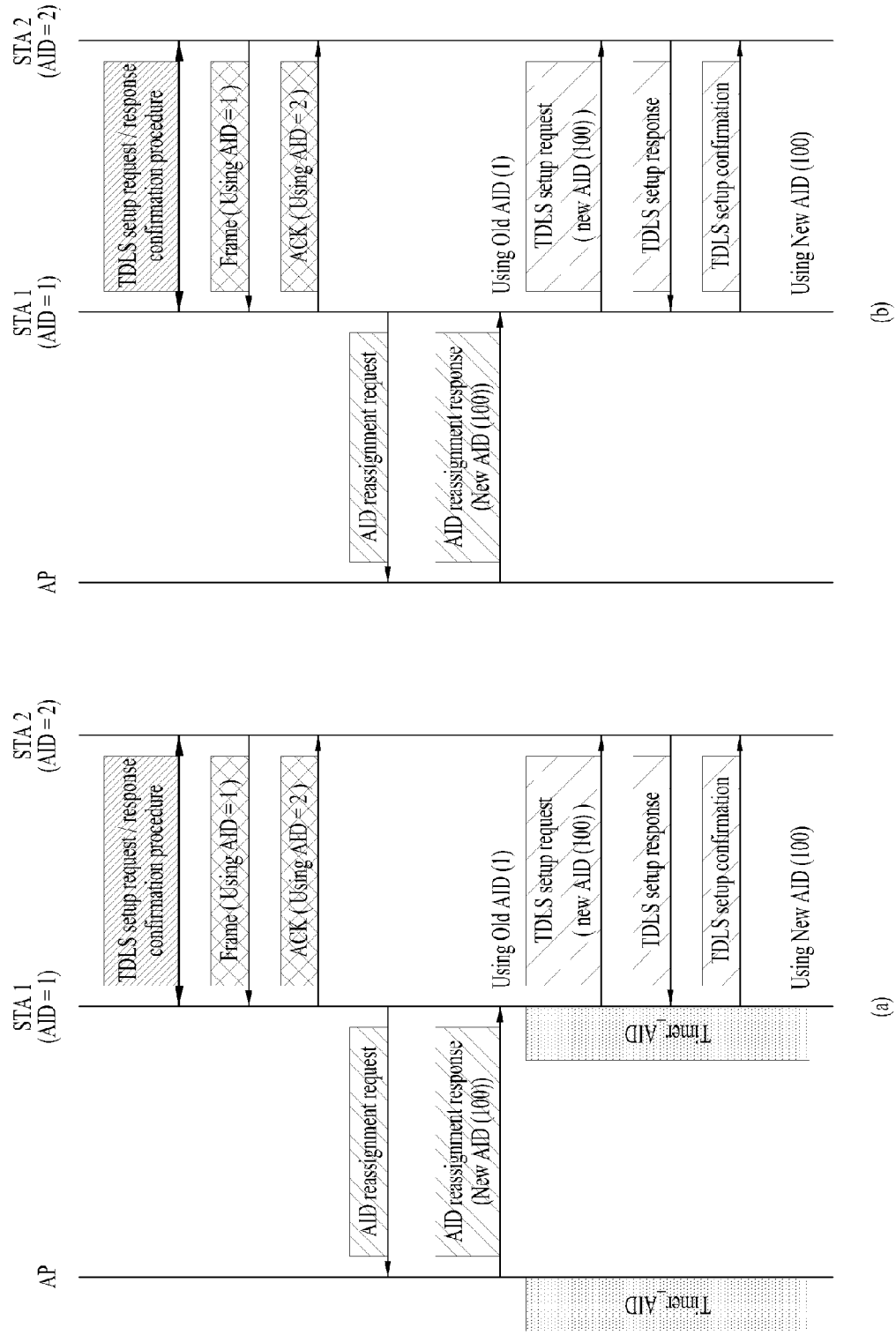
FIG. 31 is a diagram for one example to describe that an AID updated through TDLS management action frames is provided to a counterpart STA.

FIG. 31 is a diagram for one example to describe that an AID updated through TDLS management action frames is provided to a counterpart STA. Referring to FIG. 31(*a*), an STA 1, to which an AID is reassigned by an AP, is able to transmit a TDLS setup request frame containing a newly assigned AID information (New AID) to an STA 2. The STA 2 is able to recognize the AID change of the STA 1 using the newly allocated AID information contained in the TDLS setup request frame. In response to the TDLS setup request frame, the STA 2 transmits a TDLS setup response frame and the STA 1 then transmits a TDLS setup confirm frame in response to the TDLS setup response frame, thereby completing the AID update procedure. As mentioned in the foregoing description with reference to FIG. 30(*a*), The STA 1 having the new AID 100 assigned thereto starts a timer and is then able to retain the previously used AID 1 until expiration of the timer.

According to one embodiment of the present invention, like the examples shown in FIG. 30(*b*) and FIG. 31(*b*), in case that an STA having AID updated is configured to report the updated AID to a counterpart STA, the step of transceiving timer information between the AP and the STA and the step of starting the timer can be omitted. If a time taken for the STA to transmit the updated AID to the counterpart STA is considerably short, although the STA does not use two AIDs, the possibility of error occurrence of communication with the counterpart STA will be very low. In this case, in order to minimize a problem caused on communication between the STA and the counterpart STA, the STA needs to report the updated AID to the counterpart STA as soon as the AID is reassigned.

Besides, the update response frame may include an ACK frame [not shown in the drawings]. In particular, the counterpart STA may transmit the ACK frame in response to the update request frame from the STA.

Confirmation of AID Reassignment Response

Having received a reassignment response frame from an AP, an STA may be able to transmit a confirm frame to the AP in response to the received reassignment response frame. If the transmission of the confirm frame is completed, the STA can use a newly assigned AID for a frame transceiving with the AP.

After the AP has transmitted the reassignment response frame to the STA, if the AP receives the confirm frame for the AID assignment from the STA having received the reassignment response frame, the AP can perform the frame transceiving with the STA using the newly assigned AID.

In doing so, if there exists a counterpart STA having a direct link established with the STA, the confirm frame can be transmitted to the AP on the condition that the counterpart STA updates a changed AID. In particular, the STA performs a procedure for informing the counterpart STA of the AID change before transmitting the confirm frame to the AP and is then able to transmit the confirm frame to the AP. This is described in detail with reference to FIG. 32 as follows.

Figure 32:
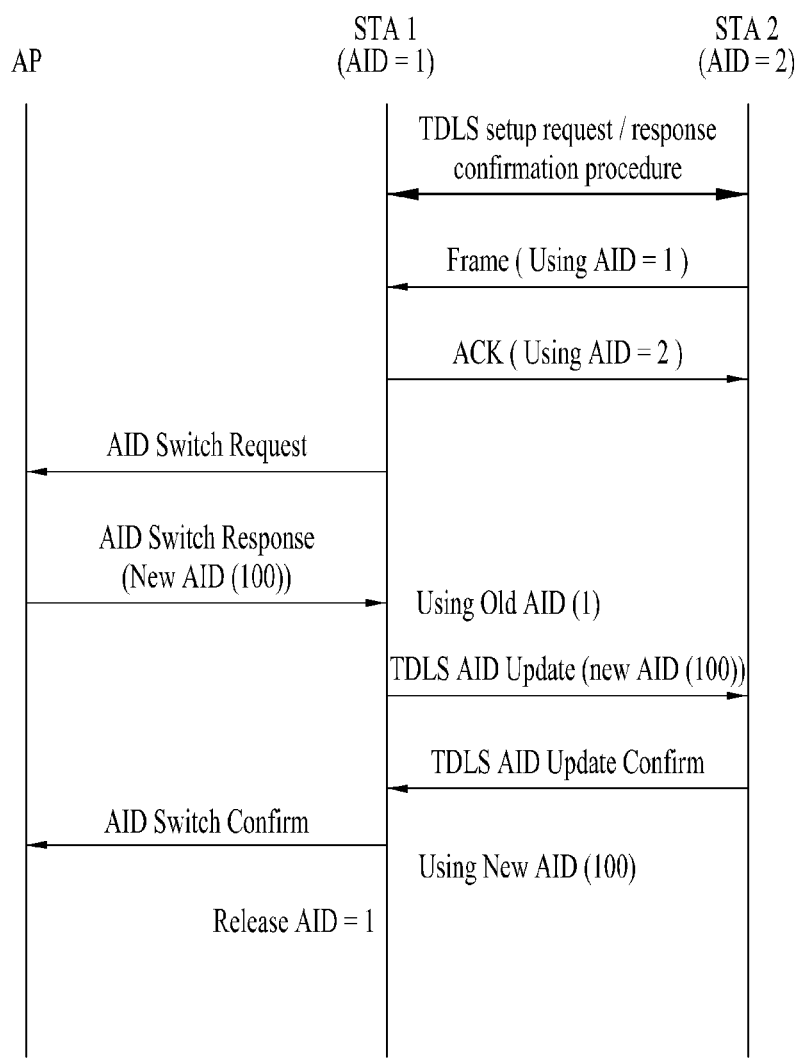
FIG. 32 is a diagram for one example to describe a process for transmitting an ACK frame to an AP.

FIG. 32 is a diagram for one example to describe a process for transmitting an ACK frame to an AP. If an STA 1 transmits an AID reassignment request frame to an AP, the AP can transmit an AID reassignment response information containing a new AID information (New AID) to the STA 1 in response to the AID reassignment request frame. If the STA 1 having a new AID 100 assigned thereto retains a direct link, the STA 1 is able to transmit a TDLS AID update frame containing the newly assigned AID information to an STA 2 in order to inform the STA 2 of the updated AID. The STA 2 updates the newly assigned AID of the STA 1 and is able to transmit a TDLS AID update confirm frame to the STA 1 in response to the TDLS AID update frame. Having received the TDLS update confirm frame from the STA 2, the STA 1 can transmit an AID reassignment confirm frame to the AP if there is no more counterpart STA to update AID. The STA 1 transmits the AID reassignment confirm frame and is then able to transceive a frame with another STA (e.g., AP, STA 2, etc.) using the newly assigned AID. Having received the reassignment confirm frame from the STA 1, the AP can assign a previously used AID to another STA.

The AP and the STA 1 can perform a frame transceiving using the previously used AID until the STA 1 transmits the AID reassignment confirm frame to the AP. In particular, although the AP has transmitted the AID reassignment frame to the STA 1, it can be configured to use the old AID until receiving the AID reassignment confirm frame.

The STA 1 and the STA 2 can perform a frame transceiving using the old AID until the STA 1 receives the TDLS AID update confirm frame from the STA 2.

Unlike the example shown in the drawing, the STA 1 may be able to use both of the old AID and the newly assigned AID from a timing point of receiving the AID reassignment response frame until receiving the AID reassignment confirm frame. In this case, the AP may be able to perform a frame transceiving with the STA 1 by selecting one of the old AID and the newly assigned AID.

FIG. 32 shows one example that the STA 1 can use the newly assigned AID if transmitting the AID reassignment confirm frame to the AP. Unlike the example shown in FIG. 32, if receiving an ACK frame for the AID reassignment confirm frame from the AP, the STA 1 can be configured to use the newly assigned AID.

Figure 33:
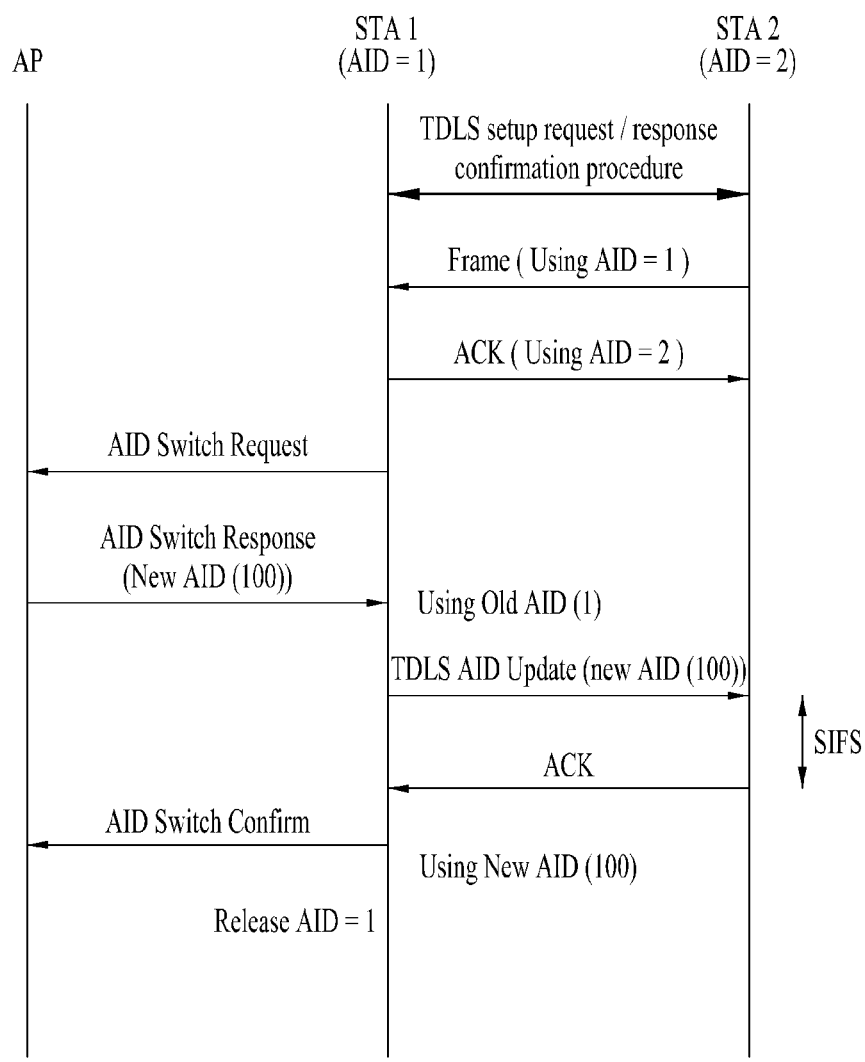
FIG. 33 is a diagram for one example to describe a process for transmitting an update response frame after a lapse of SIFS since a reception of an update request frame.

A counterpart STA can be configured to transmit an update response frame after a lapse of SIFS if receiving an update request frame from an STA. FIG. 33 is a diagram for one example to describe a process for transmitting an update response frame after a lapse of SIFS since a reception of an update request frame. Referring to FIG. 33, after an STA 2 has received a TDLS AID update frame from an STA 1, the STA 2 can transmit an ACK frame corresponding to an update response frame after a lapse of SIFS (short interframe space).

In FIG. 32 and FIG. 33, if an AP receives a confirm frame from an STA, an AID assignment procedure is ended. Yet, if the STA does not retain a direct link, the AID reassignment procedure can be ended without waiting for a reception of the confirm frame.

To this end, when the STA transmits a reassignment request frame to the AP, the reassignment request frame can be configured to contain a direct link setup information. In this case, the direct link setup information indicates whether an STA desiring to receive reassignment of AID retains a direct link. If the direct link setup information is contained in the reassignment request frame, an AID reassignment procedure is described with reference to FIG. 34. For clarity of the description, if an STA does not retain a direct link, an index of a direct link setup information is assumed as set to '0'. If an STA retains a direct link, an index of a direct link setup information is assumed as set to '1'.

Figure 34:
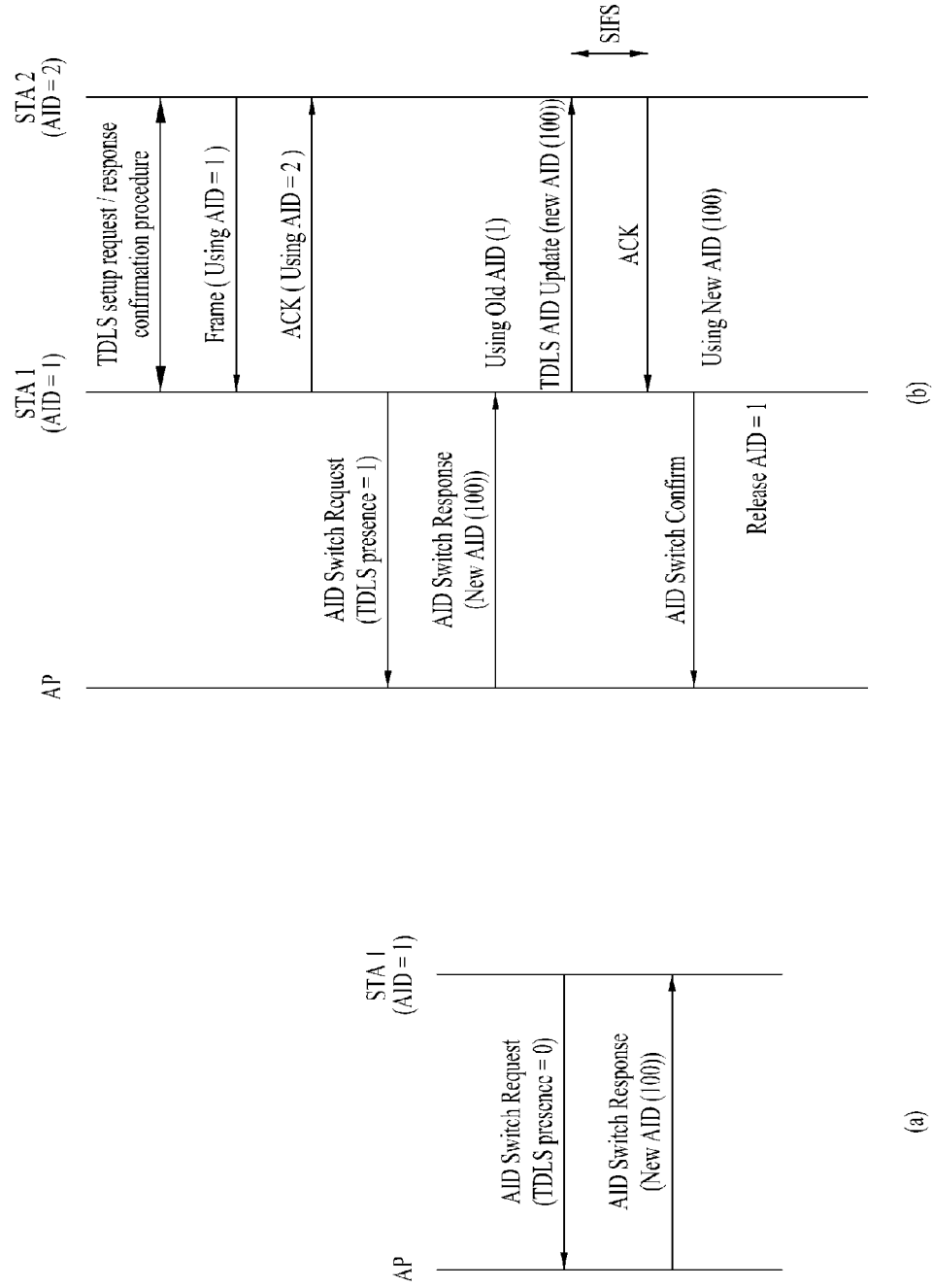
FIG. 34 is a diagram for one example to describe an AID reassignment procedure using a reassignment request frame including a direct link setup information.

FIG. 34 is a diagram for one example to describe an AID reassignment procedure using a reassignment request frame including a direct link setup information. FIG. 34(a) shows one example that an STA 1 does not retain a direct link. FIG. 34(b) shows one example that an STA 1 retains a direct link with an STA 2. Referring to FIG. 34(a), a STA 1 failing in retaining a direct link is able to set an index of a direct link setup information (TDLS Presence) to '0' while transmitting an AID switch request frame to an AP. The AP is able to recognize that the STA 1 does not retain the direct link based on the direct link setup information contained in the AID switch request information. Thereafter, the AP transmits an AID switch response frame to the STA 1 and is then able to end an AID reassignment procedure without waiting for a reception of a confirm frame. Having ended the AID reassignment procedure, the AP can transceive a frame with the STA 1 using a newly reassigned AID 100 and is able to assign AID 1 previously used by the STA 1 to another STA. Having received the AID switch response frame from the AP, the STA 1 is able to perform a frame transceiving using the new AID 100 as well.

On the contrary, referring to FIG. 34(b), if an STA 1 retains a direct link with an STA 2, the STA 1 is able to set an index of a direct link setup information (TDLS Presence) to '1' while transmitting an AID switch request frame to an AP. The AP is able to recognize that the STA 1 retains the direct link based on the direct link setup information contained in the AID switch request information. Hence, the AP transmits an AID switch response frame to the STA 1, transmits a confirm frame for the AID switch response frame, and is then able to end an AID reassignment procedure. Having ended the AID reassignment procedure, the AP can transceive a frame with the STA 1 using a newly reassigned AID 100 and is able to assign an AID 1 previously used by the STA 1 to another STA.

Having received the AID switch response frame from the AP, the STA 1 transmits an update request frame containing a new AID information (New AID) to the STA 2 and is then able to receive an update response frame from the STA 2 in response to the update request frame. If there is no more STA to update AID, the STA 1 can control an AID reassignment procedure to be ended by transmitting a confirm frame to the AP.

As mentioned in the foregoing description, the STA 1 can use both of the old AID 1 and the new AID 100 from a timing point of receiving the AID switch response frame until transmitting the confirm frame.

A direct link number information can be further contained in the reassignment request frame forwarded to the AP by the STA in addition to the direct link setup information. This is described in detail with reference to FIG. 35 as follows.

Figure 35:
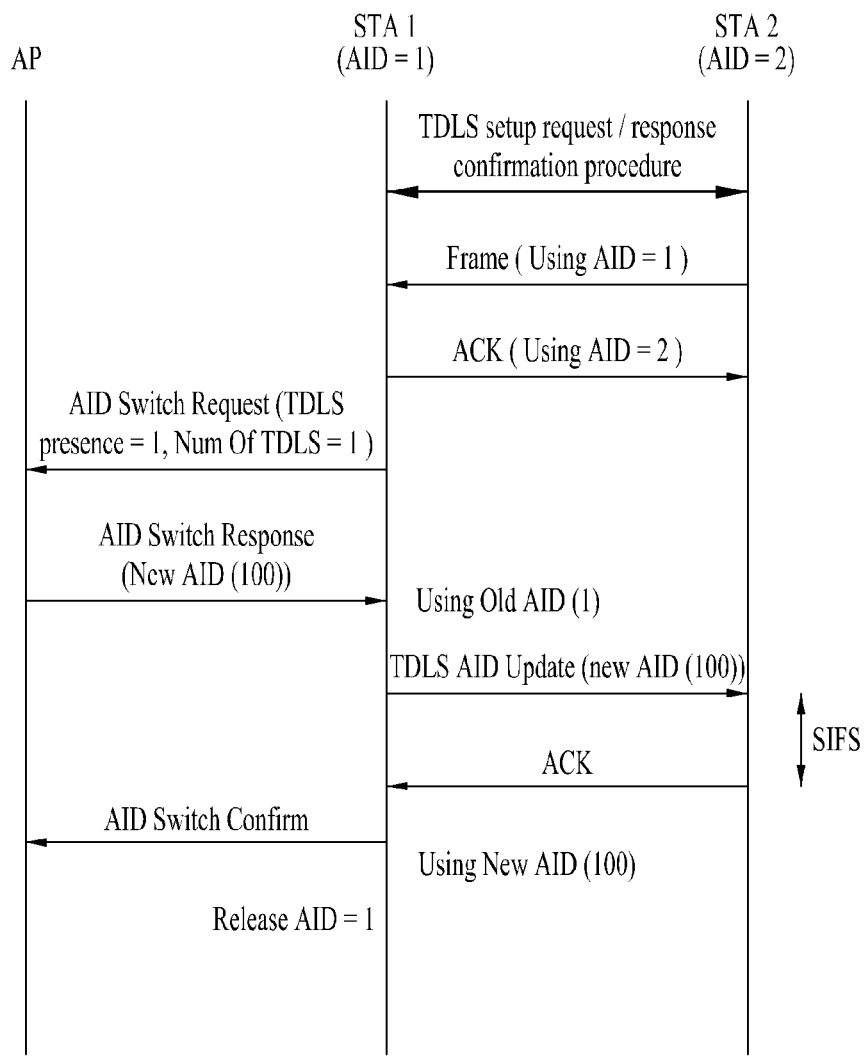
FIG. 35 is a diagram for one example to describe an AID reassignment procedure when a direct link number information is contained in a reassignment request frame.

FIG. 35 is a diagram for one example to describe an AID reassignment procedure when a direct link number information is contained in a reassignment request frame.

Referring to FIG. 35, an STA 1 retaining a direct link is able to set an index of a direct link setup information to '1' while transmitting an AID switch request frame to an AP. In addition, the STA 1 can control a direct link number information (Num of TDLS) to be contained in the AID switch request frame. In FIG. 35, since the number of the direct link retained by the STA 1 is 1, the direct link number information may be set to '1'.

Based on the direct link setup information and the direct link number information contained in the AID switch request frame, the AP recognizes whether the STA 1 retains the direct link and is also able to recognize the number of direct link(s). If the STA 1 does not retain the direct link, like the example shown in FIG. 34(a), the AP can end an AID reassignment procedure by transmitting an AID switch response frame without waiting for a reception of a confirm frame. Otherwise, like the example shown in FIG. 35, if the STA 1 retains the direct link, the AP transmits an AID switch response frame and may be then able to end an AID reassignment procedure by receiving a confirm frame from the STA 1 in response to the AID switch response frame.

If the STA 1 does not have a configured direct link, like the example shown I FIG. 34(a), the STA 1 may be able to end an AID reassignment procedure by receiving an AID switch response frame. Otherwise, like the example shown in FIG. 35, if the STA 1 retains a direct link with the STA 2, the STA 1 may be able to end an AID reassignment procedure by transmitting a confirm frame to the AP after the end of an APD update procedure with the STA 2.

In case that the STA 1 retains direct links with a plurality of counterpart user equipments, the STA 1 can transmit a confirm frame to the AP after completion of an AID update procedure with all counterpart STAs.

For another instance, the STA 1 can transmit a confirm frame to the AP each time an AID update procedure with each of the counterpart STAs is completed. In this case, the AP may be able to end an AID reassignment procedure on the condition that confirm frames of which number matches a direct link number information are received.

As an AID of a different group is assigned to an STA, if a group to which the STA and a counterpart STA belong is changed, it may cause a problem that the STA and the counterpart STA have different listening intervals. Hence, an AP can control an AID of the counterpart STA directly communicating with the STA to be changed while changing an AID of the STA. To this end, an AID information of the counterpart AID can be further contained in a reassignment request frame transmitted to the AP by the AP in addition to a direct link setup information and a direct link information.

The AP can control a new AID to be assigned to a counterpart STA while assigning a new AID to an STA, using an AID information of the counterpart STA. By changing AIDs of the STA and the counterpart STA simultaneously, the AP can control the STA and the counterpart STA to belong to the same group. This is described in detail with reference to FIG. 36 as follows.

Figure 36:
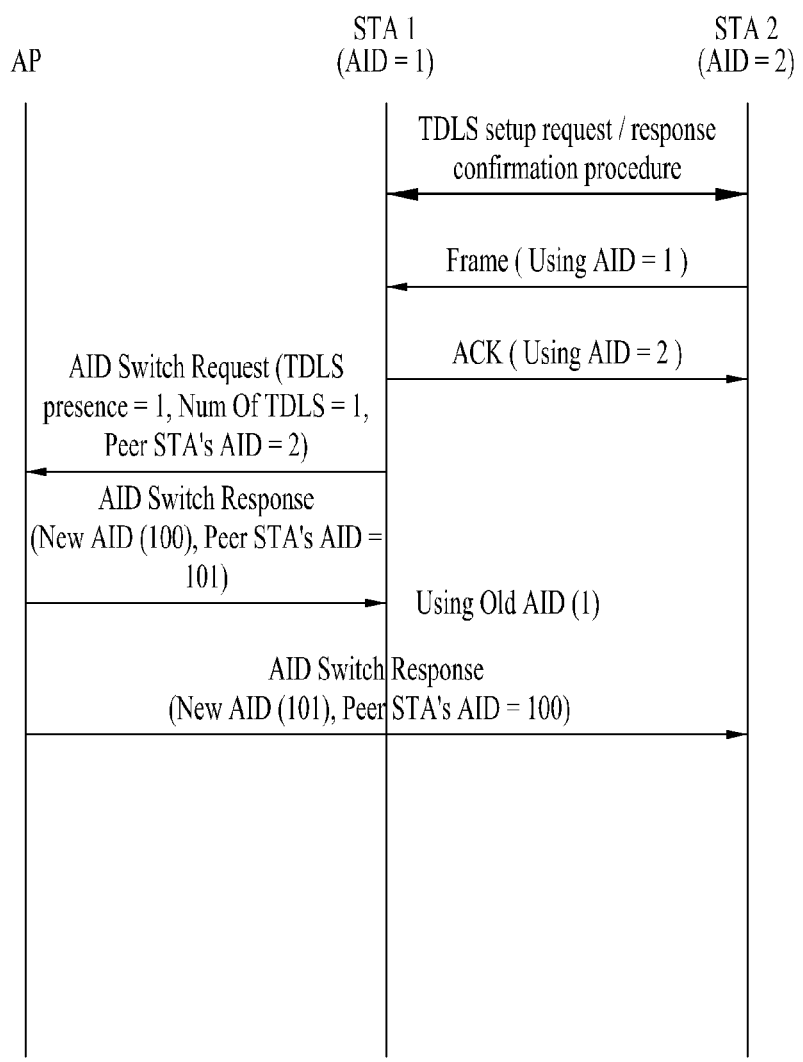
FIG. 36 is a diagram for one example to describe a process for an AP to announce a new AID to a counterpart STA in direct.

FIG. 36 is a diagram for one example to describe a process for an AP to announce a new AID to a counterpart STA in direct. Referring to FIG. 36, a STA 1 retaining a direct link can set an index of a direct link setup information to '1' while transmitting an AID switch request frame to an AP. In addition, the STA 1 can control a direct link number information (Num of TDLS) and an AID information of an STA 2 becoming a target of a direct communication to be contained in the AID switch request frame. In FIG. 36, since the number of direct link retained by the STA 1 is 1 and an AID of the STA 2 performing the direct communication with the STA 1 is 2, the direct link setup information and the AID information of the counterpart AID can be set to '1' and '2', respectively.

Based on the direct link setup information, the direct link number information and the AID information of the counterpart STA contained in the AID switch request frame, the AP can recognize a presence or non-presence of a direct link retained by the STA 1, the number of direct link(s) and the AID of the counterpart STA directly communicating with the STA 1.

In response to the AID switch request frame, the AP can transmit a $1^{st}$ AID switch response frame to the STA 1. In the $1^{st}$ AID switch response frame, both an AID information (New AID) on an AID to be newly assigned to the STA 1 and an AID information (Peer STA's AID) on an AID to be newly assigned to the STA 2 can be contained. The STA 1 having a new AID 100 assigned thereto can perform a frame transceiving with the STA 2 using an AID 101 to be newly assigned to the STA 2. In the $1^{st}$ AID switch response frame, an old AID information on an AID previously used by the STA 2 can be further contained [not shown in the drawing]. The STA 1 searches for STA matching the old AID information and is then able to update an AID of the found STA 2.

In addition, the AP can transmit a $2^{nd}$ AID switch response frame to the STA 2 currently performing a direct communication with the STA 1. In the $2^{nd}$ AID switch response frame, like the $1^{st}$ AID switch response frame, both an AID information (Peer STA' s AID) on an AID to be newly assigned to the STA 1 and an AID information (New AID) on an AID to be newly assigned to the STA 2 can be contained. The STA 2 having a new AID 101 assigned thereto can perform a frame transceiving with the STA 1 using an AID 100 to be newly assigned to the STA 1. In the $2^{nd}$ AID switch response frame, an old AID information on an AID previously used by the STA 1 can be further contained [not shown in the drawing]. The STA 2 searches for STA matching the old AID information and is then able to update an AID of the found STA 1. In FIG. 36, the AP transmits the AID switch response frame containing both of the AID information on the AID to be newly assigned to the STA 1 and the AID information on the AID to be newly assigned to the STA 2 to the STA 2. Yet, according to one embodiment of the present invention, the AID switch response frame transmitted to the STA 1 and the STA 2 by the AP may contain the AID information on the AID to be newly assigned to the STA 1 only except the AID information on the AID to be newly assigned to the STA 2. In this case, the AID switch response frame transmitted to the STA 2 by the AP may simply play a role in forwarding a new AID information of the STA 1 to the STA 2. In particular, in FIGS. 30 to 35, the STA 1 directly transmits the new AID information to the STA 2. On the other hand, the AP can subjectively transmit the new AID information of the STA 1 to the STA 2. This is described in detail with reference to FIG. 37 as follows.

Figure 37:
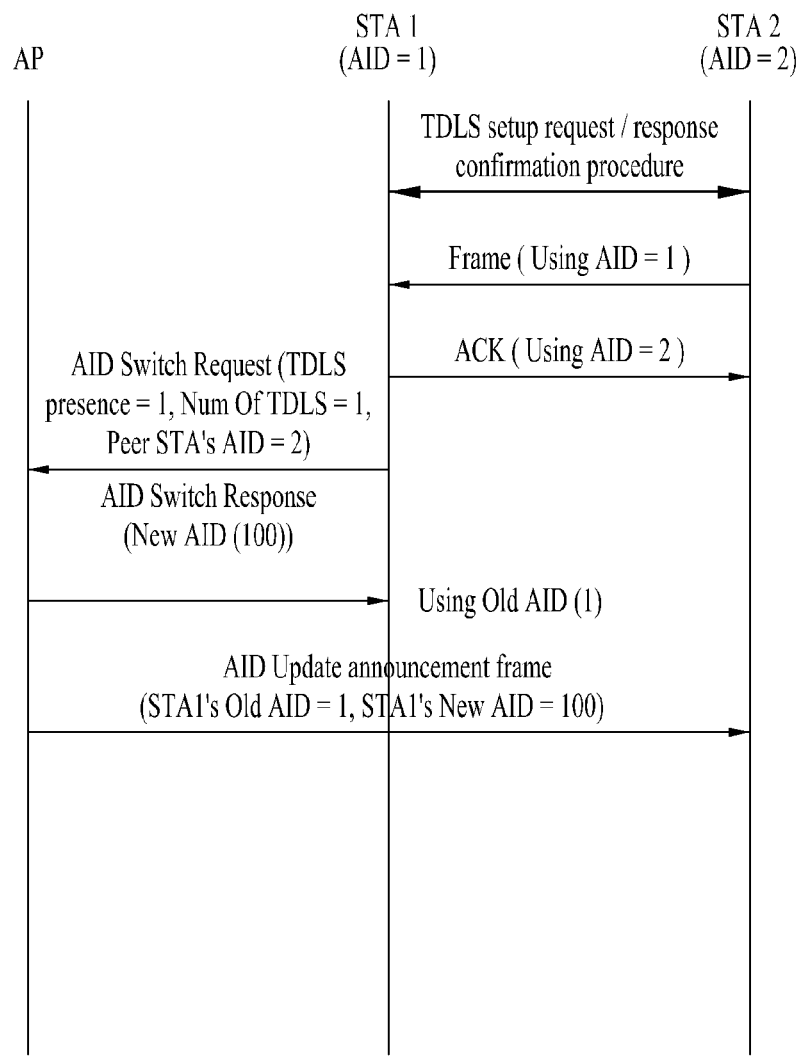
FIG. 37 is a diagram for one example to describe a process for an AP to subjectively announce a changed AID of an STA to a counterpart STA performing a direct communication with the STA.

FIG. 37 is a diagram for one example to describe a process for an AP to subjectively announce a changed AID of an STA to a counterpart STA performing a direct communication with the STA. An STA 1 retaining a direct link can provide an AP with an AID information of an STA 2 performing a direct communication with the STA 1 while transmitting an AID switch request frame to the AP.

In response to the AID switch request frame of the STA 1, the AP can transmit an AID switch response frame containing a new AID information to the STA 1. In addition, like the example shown in FIG. 37, the AP can transmit an AID update announcement fame for announcing a changed AID of the STA 1 to the STA 2 performing the direct communication with the STA 1. In the AID update announcement frame, an old AID information and a new AID information of the STA 1 can be contained. Having received the AID update announcement frame from the AP, the STA 2 can update an AID of the STA 1 matching the old AID information into a new AID indicated by the new AID information.

Pausing Partial AID PHY Filtering Function for Prescribed Period

If an STA having an AID reassigned thereto by an AP retains a direct link, the STA can pause a partial AID PHY filtering function until announcing the changed AID to counterpart STAs (i.e., until an AID update procedure is completed). In case of pausing the partial AID PHY filtering function, the STA is able to check whether a frame transmitted by the counterpart STA is destined for the corresponding STA by entirely decoding a MAC header of the corresponding frame. Thereafter, if an AID update procedure is completed, the STA resumes the partial AID PHY filtering function and is then able to check whether the frame is transmitted to the corresponding STA by checking a partial AID.

Accordingly, although the STA performs an unnecessary frame decoding until announcing the changed AID to the counterpart, the STA is able to validly receive a frame from the counterpart STA unaware of a new AID.

Configuration of Wireless Device

Figure 38:
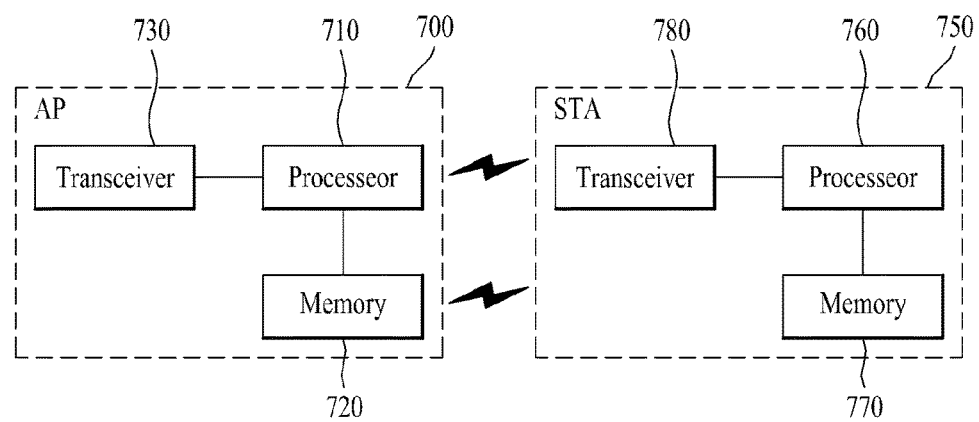
FIG. 38 is a block diagram for a configuration of a wireless device according to one embodiment of the present invention.

FIG. 38 is a block diagram for a configuration of a wireless device according to one embodiment of the present invention.

Referring to FIG. 38, an AP 420 includes a processor 421, a memory 422 and a transceiver 423. The processor 421 implements the functions, processes and/or methods proposed by the present invention. Layers of a radio interface protocol (cf. FIG. 5) can be implemented by the processor 421. The memory 422 is connected to the processor 421 and stores various kinds of informations for driving the processor 421. The transceiver 423 is connected to the processor 421 and then transmits and/or receives radio signals.

An STA 430 includes a processor 431, a memory 432 and a transceiver 433. The processor 431 implements the functions, processes and/or methods proposed by the present invention. Layers of a radio interface protocol (cf. FIG. 5) can be implemented by the processor 431. The memory 432 is connected to the processor 431 and stores various kinds of informations for driving the processor 431. The transceiver 431 is connected to the processor 241 and then transmits and/or receives radio signals.

The memory 422/432 may be included inside or outside the processor 421/431 and then connected to the processor 421/431 via a means known well to the public. Optionally, the AP 420 and/or the STA 430 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Various embodiments according to the present invention are mainly described with reference to the examples applying to IEEE 802.11 system and can identically apply to various kinds of wireless access systems as well as to IEEE 802.11 system.

What is claimed is:

1. A method of changing association identification (AID) of a first station performing a direct communication with a second station in a wireless communication system, the method comprising:
   transmitting, by the first station to an access point (AP), a switch request frame for requesting a new AID when a traffic pattern of the first station changes,
   wherein a group consisting of stations having a same listen interval is distinguished by the AID,
   wherein a listen interval of the first station and a group, to which the first station is associated, are changed when the traffic pattern of the first station changes,
   wherein the AID of the first station is updated based on the change in listen interval of the first station and the change in the group of the first station,
   wherein the first station and the second station have an established direct link, and
   wherein the direct link is established based on a tunneled direct link setup;
   receiving, by the first station from the AP, a switch response frame containing new AID information which is newly assigned to the first station and the second station,
   transmitting, by the first station, the new AID information included in the switch response frame to the second station; and
   changing the AID of the first station and the second station using the received new AID information.

2. The method of claim 1, further comprising the step of starting a timer by the first station when the switch response frame is received, wherein the first station uses both a new AID and an initial AID until the timer expires.

3. The method of claim 2, wherein the first station communicates with the AP using either the new AID or the initial AID.

4. The method of claim 2, wherein if the timer expires, the first station releases the initial AID.

5. The method of claim 1, wherein the switch request frame includes a direct link setup information indicating a presence of the established direct link of the first station and second station.

6. The method of claim 5, wherein the switch request frame further includes a direct link number information indicating the number of established direct link(s) of the first station.

7. The method of claim 1, wherein the first station pauses a partial AID PHY filtering until receiving the update response frame from the second station.

8. A first station device for changing an association identification (AID) in the course of performing a direct communication with a second station, the first station comprising:
   a transceiver that transmits and receives a wireless signal; and
   a processor that controls the transceiver to transmit, to an access point (AP), a switch request frame for requesting a new AID when a traffic pattern of the first station changes,
   wherein a group consisting of stations having a same listen interval is distinguished by the AID,
   wherein a listen interval of the first station and a group, to which the first station is associated, are changed when the traffic pattern of the first station changes,
   wherein the AID of the first station is updated based on the change in listen interval of the first station and the change in the group of the first station,
   wherein the first station and the second station have an established direct link, and
   wherein the direct link is established based on a tunneled direct link setup,
   controls the transceiver to receive, from the AP, a switch response frame containing new AID information which is newly assigned to the first station and the second station when a traffic pattern of the first station changes,
   controls the transceiver to transmit the new AID information included in the switch response frame to the second station, and
   changes the AID of the first station and the second station using the received new AID information.

* * * * *